(12) United States Patent
Seo et al.

(10) Patent No.: US 12,461,415 B2
(45) Date of Patent: Nov. 4, 2025

(54) SUBSTRATE

(71) Applicant: LG Chem, Ltd., Seoul (KR)

(72) Inventors: Han Min Seo, Daejeon (KR); Young Jin Park, Daejeon (KR); Seung Heon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/716,759

(22) PCT Filed: Dec. 7, 2022

(86) PCT No.: PCT/KR2022/019790
§ 371 (c)(1),
(2) Date: Jun. 5, 2024

(87) PCT Pub. No.: WO2023/106825
PCT Pub. Date: Jun. 15, 2023

(65) Prior Publication Data
US 2025/0044647 A1 Feb. 6, 2025

(30) Foreign Application Priority Data

| Dec. 9, 2021 | (KR) | .......... | 10-2021-0175385 |
| Dec. 9, 2021 | (KR) | .......... | 10-2021-0175386 |
| Dec. 9, 2021 | (KR) | .......... | 10-2021-0175387 |
| Dec. 9, 2021 | (KR) | .......... | 10-2021-0175389 |

(51) Int. Cl.
*G02F 1/1339* (2006.01)

(52) U.S. Cl.
CPC ...... *G02F 1/13394* (2013.01); *G02F 1/13398* (2021.01)

(58) Field of Classification Search
CPC .......... G02F 1/13394; G02F 1/13398
See application file for complete search history.

(56) References Cited

U.S. PATENT DOCUMENTS

| 6,016,180 | A | * | 1/2000 | Bradshaw | ............ G02F 1/141 |
| | | | | | 349/156 |
| 2004/0165131 | A1 | | 8/2004 | Anderson et al. | |
| 2009/0115962 | A1 | | 5/2009 | Bovet et al. | |
| | | | | (Continued) | |

FOREIGN PATENT DOCUMENTS

| EP | 2998768 A1 | 3/2016 |
| JP | 2517589 B2 | 7/1996 |
| | (Continued) | |

OTHER PUBLICATIONS

Extended European Search Report including Written Opinion for Application No. 22904653.7 dated Jan. 29, 2025, pp. 1-7.

(Continued)

*Primary Examiner* — Donald L Raleigh
(74) *Attorney, Agent, or Firm* — Lerner David LLP

(57) ABSTRACT

The present application provides a substrate comprising a spacer pattern. The present application can provide a substrate, which is applied to various optical devices, capable of evenly and stably maintaining a gap between substrates while maximally securing an active region without causing any optical defects, including a diffraction phenomenon, and the like. The present application can also provide an optical device comprising the substrate.

15 Claims, 16 Drawing Sheets

(56) References Cited

U.S. PATENT DOCUMENTS

| | | |
|---|---|---|
| 2010/0118254 A1 | 5/2010 | Hashimoto |
| 2012/0236237 A1 | 9/2012 | Kanari et al. |
| 2012/0268671 A1 | 10/2012 | Inoue et al. |
| 2013/0208343 A1 | 8/2013 | Yang et al. |
| 2015/0362741 A1 | 12/2015 | Oh et al. |
| 2018/0321535 A1 | 11/2018 | Kim et al. |
| 2020/0124894 A1 | 4/2020 | Seo et al. |
| 2020/0150478 A1 | 5/2020 | Seo et al. |
| 2021/0157197 A1 | 5/2021 | Miller, IV et al. |
| 2022/0357607 A1 | 11/2022 | Song et al. |
| 2023/0059263 A1 | 2/2023 | Song et al. |

FOREIGN PATENT DOCUMENTS

| | | |
|---|---|---|
| JP | H1068934 A | 3/1998 |
| JP | 2005321705 A | 11/2005 |
| JP | 2009501953 A | 1/2009 |
| JP | 2012234142 A | 11/2012 |
| JP | 2015508910 A | 3/2015 |
| KR | 20120105357 A | 9/2012 |
| KR | 20150088565 A | 8/2015 |
| KR | 20150142891 A | 12/2015 |
| KR | 20160094566 A | 8/2016 |
| KR | 20200134758 A | 12/2020 |
| KR | 20210105087 A | 8/2021 |
| WO | 2019022565 A1 | 1/2019 |
| WO | 2021167272 A1 | 8/2021 |
| WO | 2021167273 A1 | 8/2021 |

OTHER PUBLICATIONS

International Search Report for Application No. PCT/KR2022/019787 mailed Mar. 16, 2023, pp. 1-2.

International Search Report for Application No. PCT/KR2022/019790 mailed Mar. 16, 2023, pp. 1-2.

International Search Report for Application No. PCT/KR2022/019793 mailed Mar. 15, 2023, pp. 1-3.

\* cited by examiner

[Figure 1]
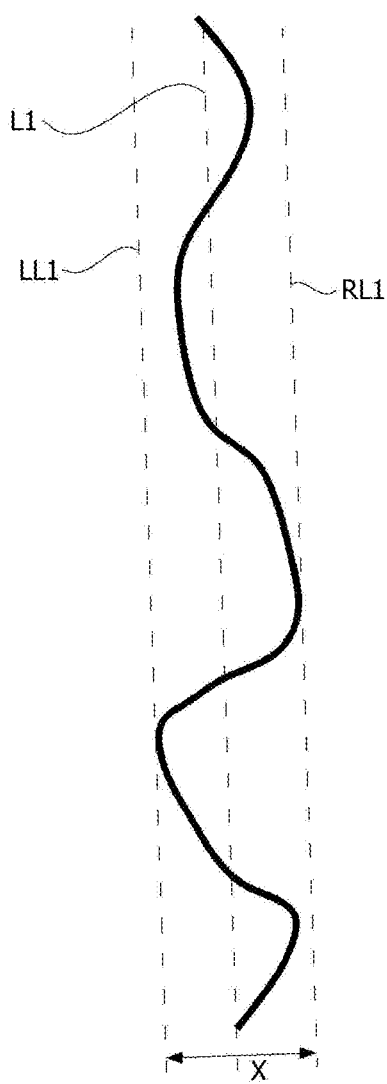

[Figure 2]
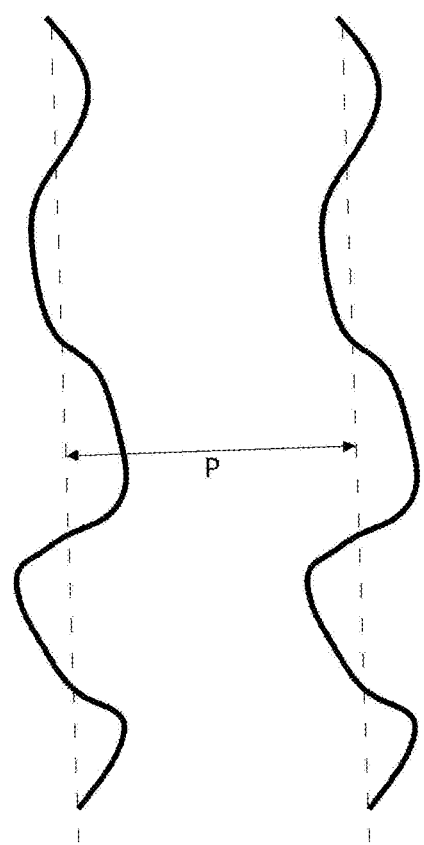

[Figure 3]
(a) 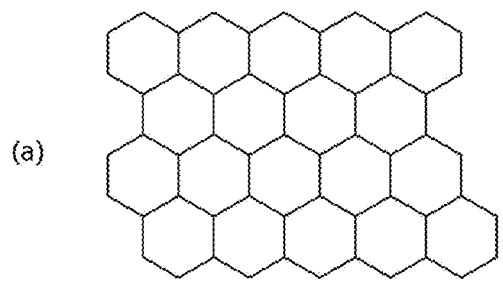
(b) 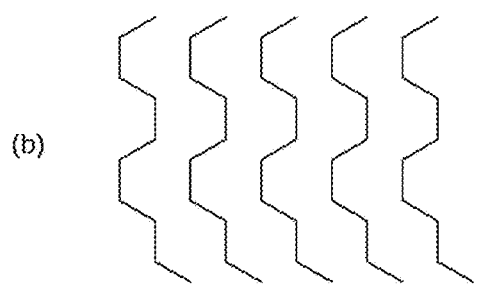
(c) 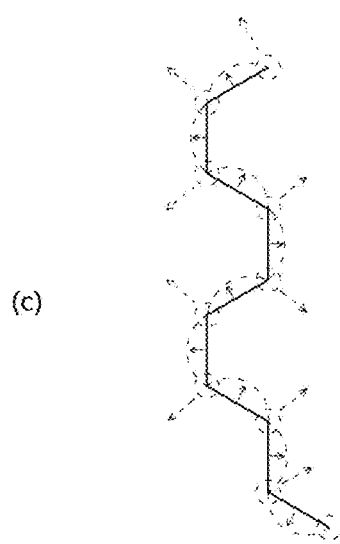

[Figure 4]
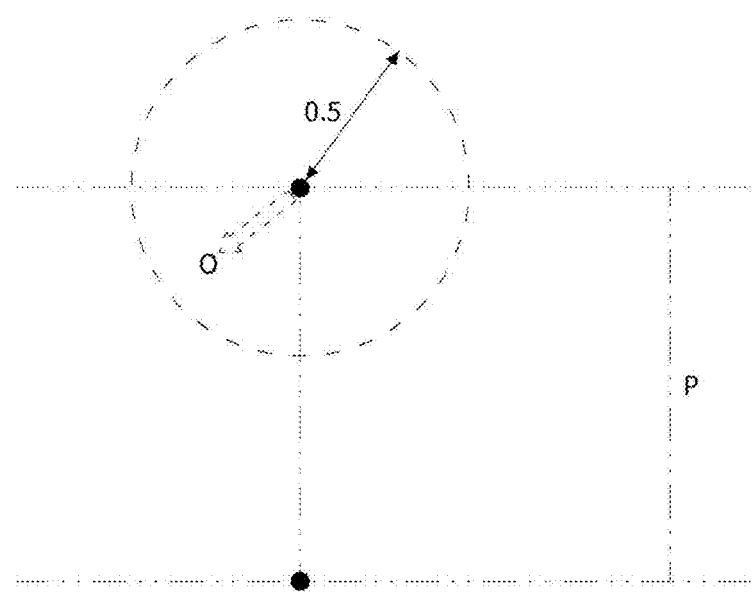
[Figure 5]
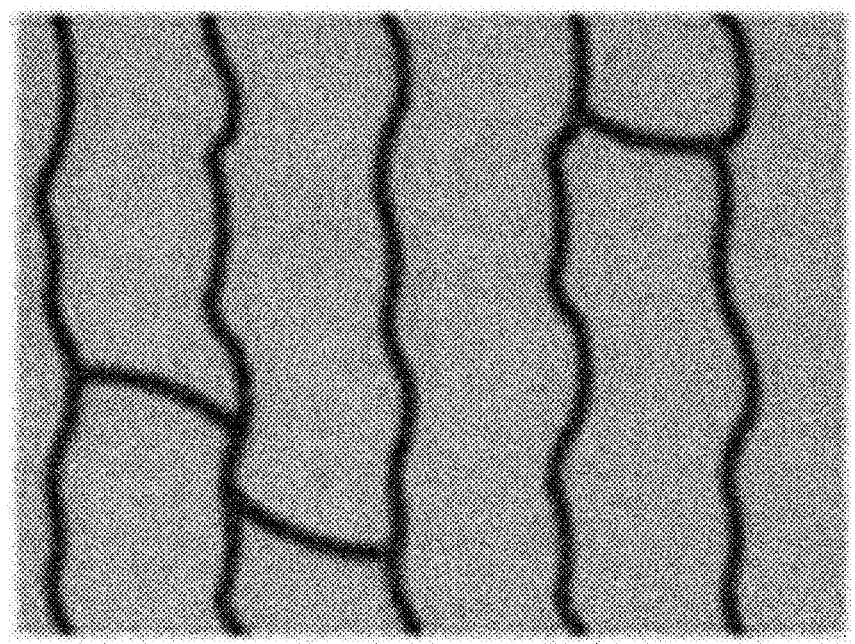

[Figure 6]
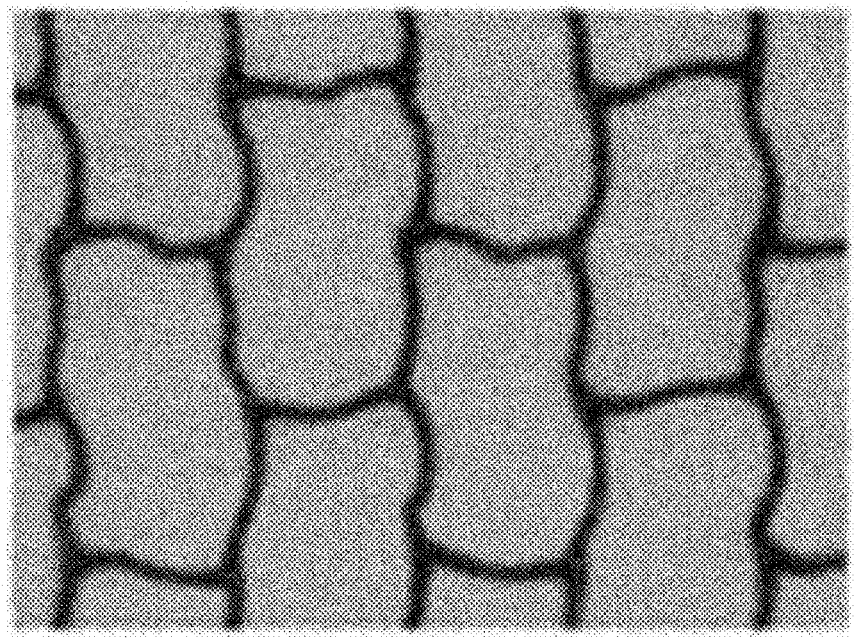
[Figure 7]
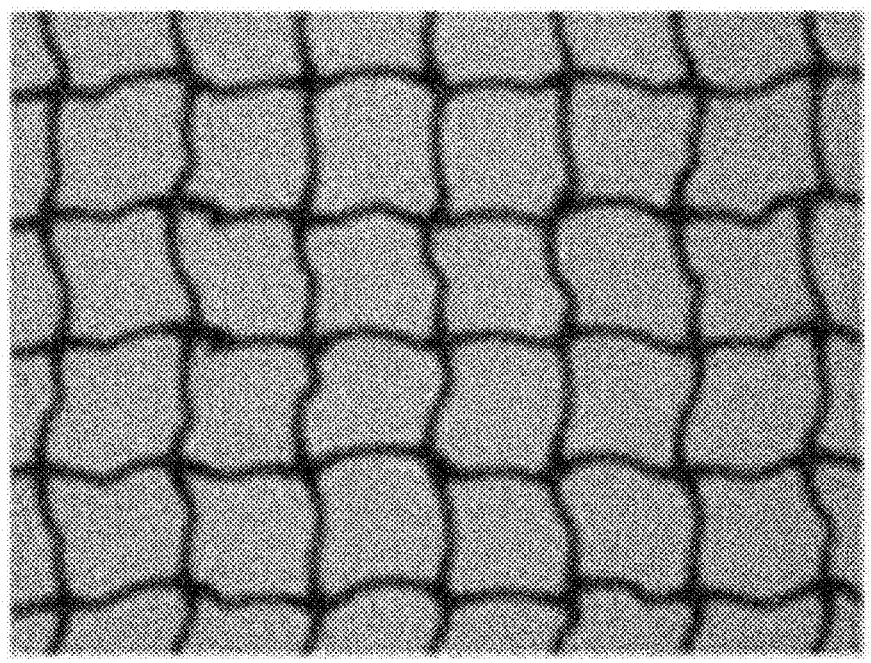

[Figure 8]
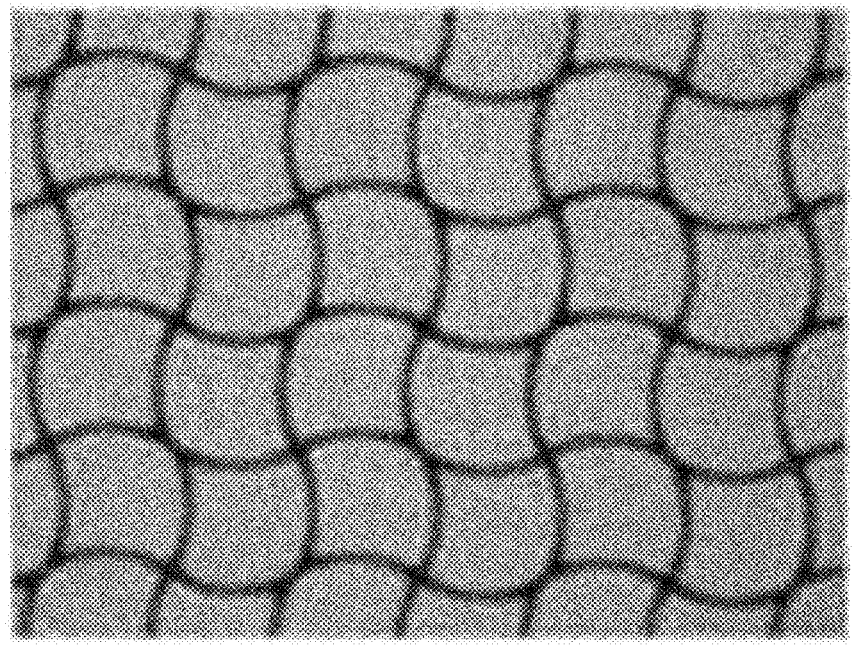
[Figure 9]
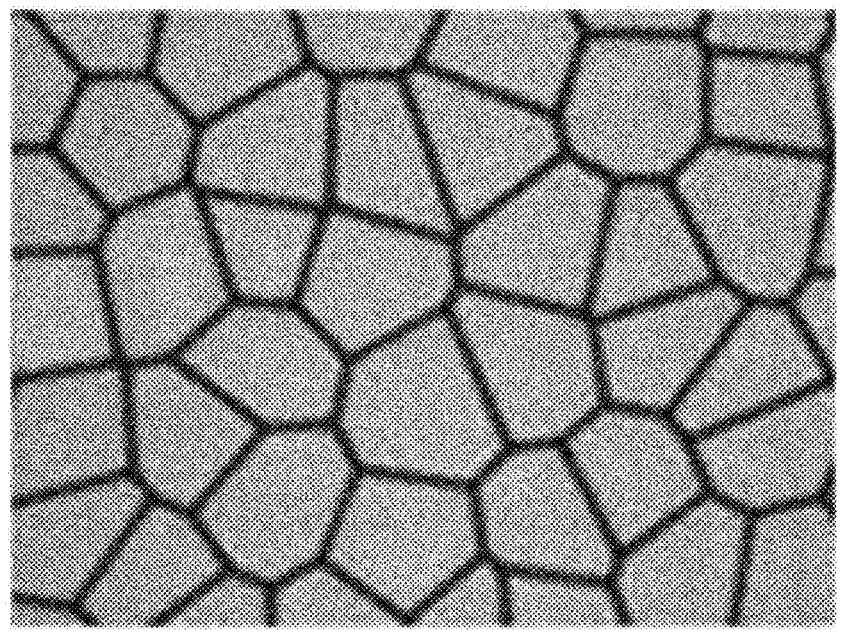

[Figure 10]
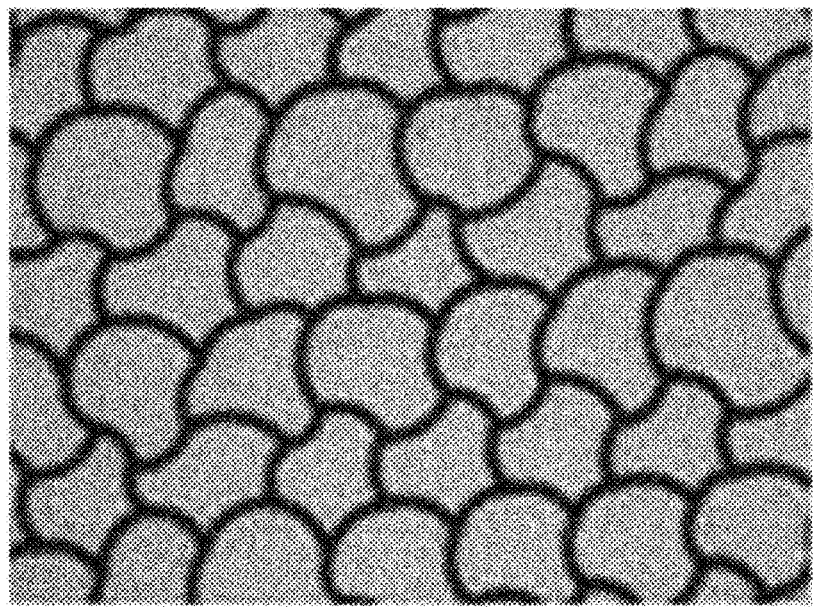

[Figure 11]
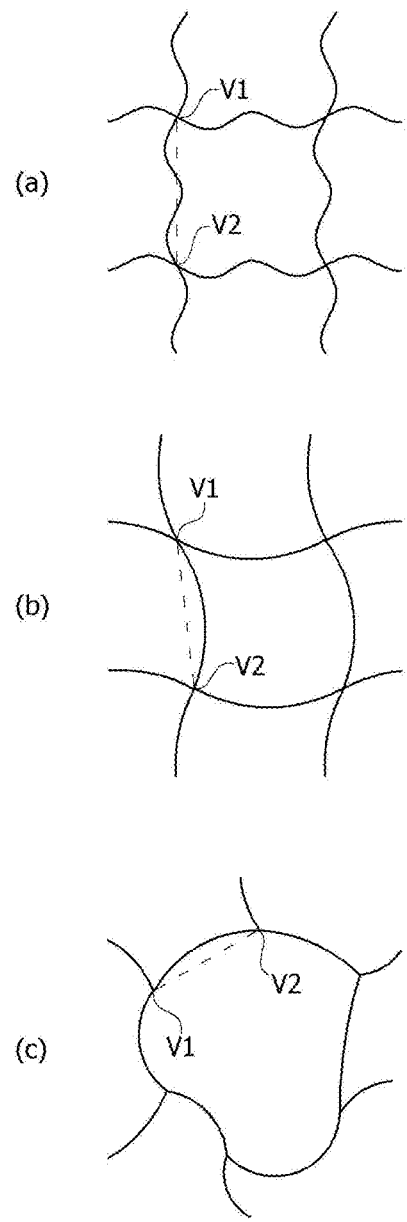

[Figure 12]
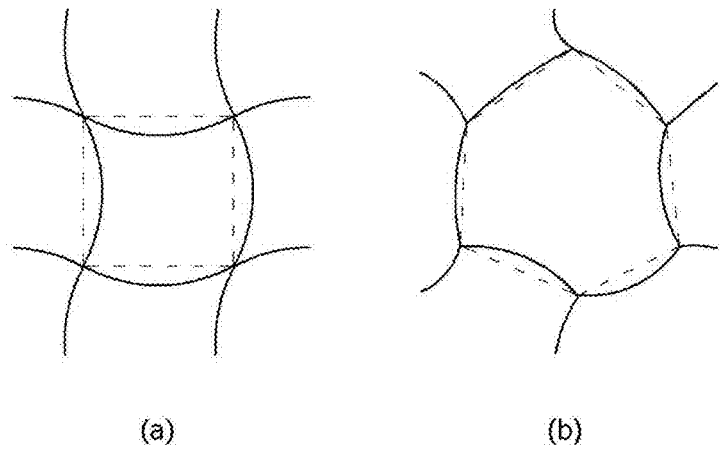
(a)　　　　　　　　(b)
[Figure 13]
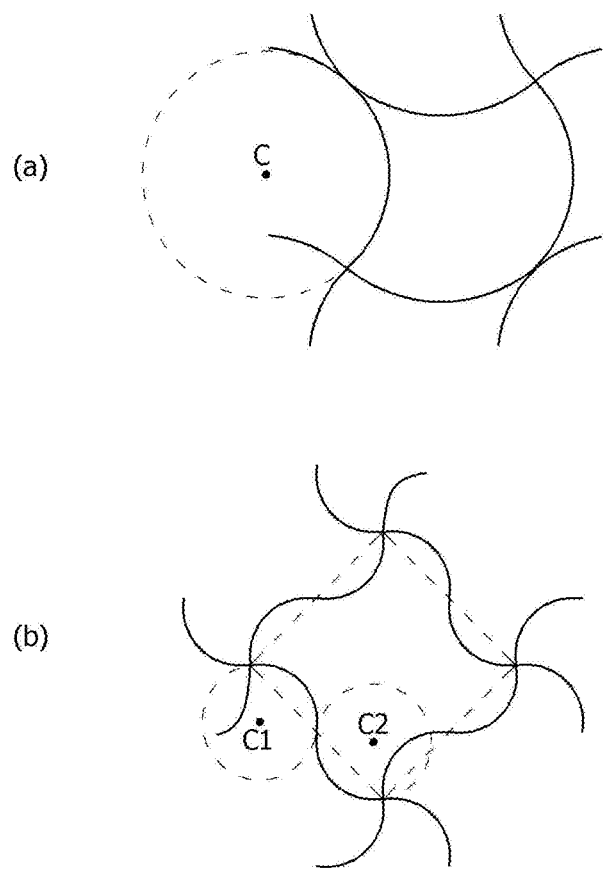

[Figure 14]
| 91 | 92 | 93 | 94 | 95 | 96 | 97 | 98 | 99 | 100 |
|----|----|----|----|----|----|----|----|----|-----|
| 81 | 82 | 83 | 84 | 85 | 86 | 87 | 88 | 89 | 90 |
| 71 | 72 | 73 | 74 | 75 | 76 | 77 | 78 | 79 | 80 |
| 61 | 62 | 63 | 64 | 65 | 66 | 67 | 68 | 69 | 70 |
| 51 | 52 | 53 | 54 | 55 | 56 | 57 | 58 | 59 | 60 |
| 41 | 42 | 43 | 44 | 45 | 46 | 47 | 48 | 49 | 50 |
| 31 | 32 | 33 | 34 | 35 | 36 | 37 | 38 | 39 | 40 |
| 21 | 22 | 23 | 24 | 25 | 26 | 27 | 28 | 29 | 30 |
| 11 | 12 | 13 | 14 | 15 | 16 | 17 | 18 | 19 | 20 |
| 1  | 2  | 3  | 4  | 5  | 6  | 7  | 8  | 9  | 10 |
[Figure 15]
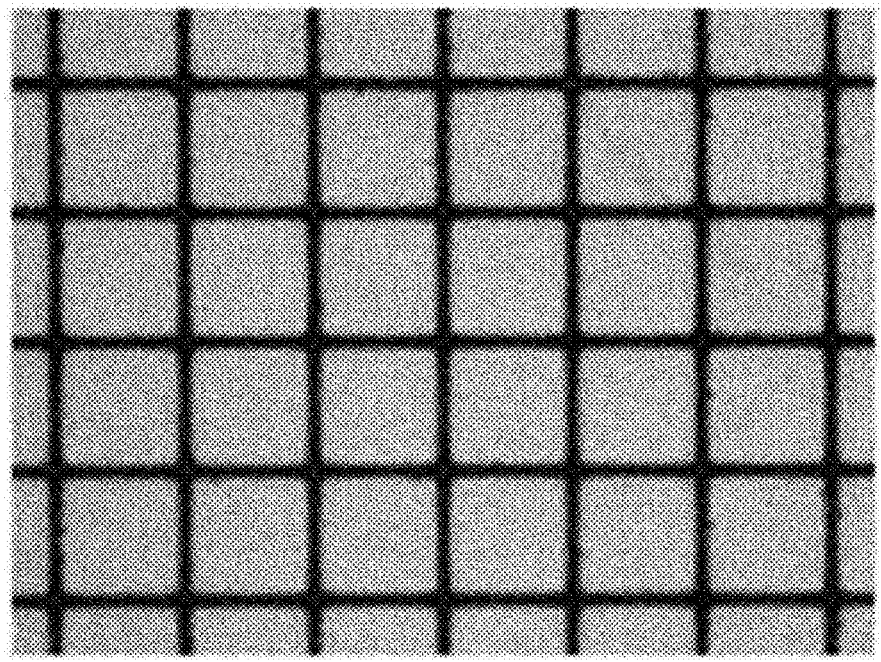

[Figure 16]
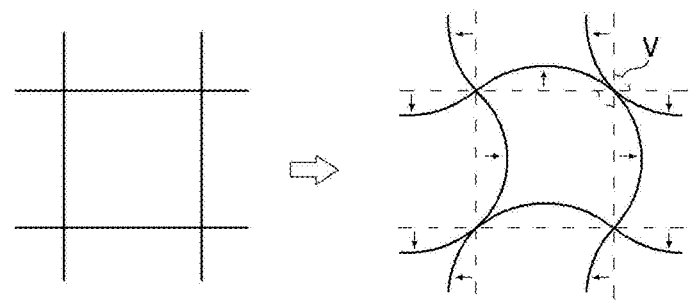
[Figure 17]
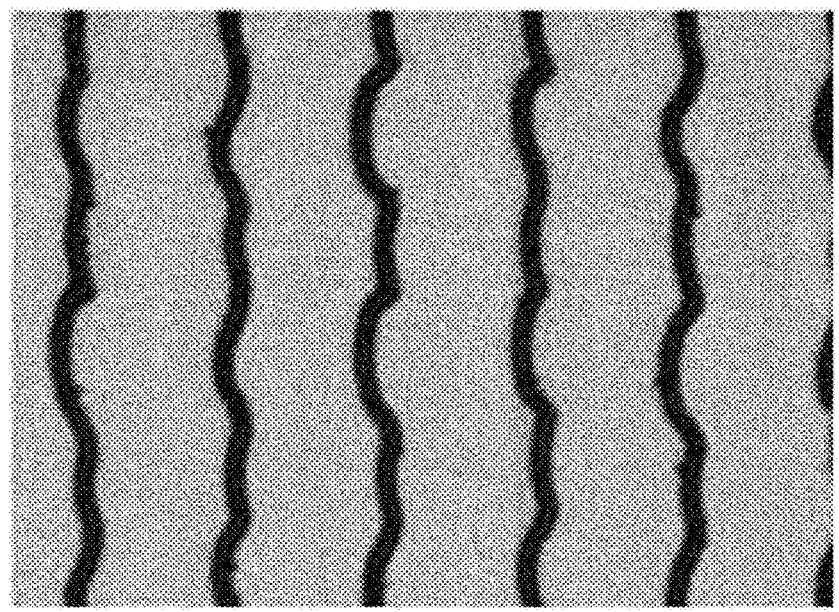

[Figure 18]
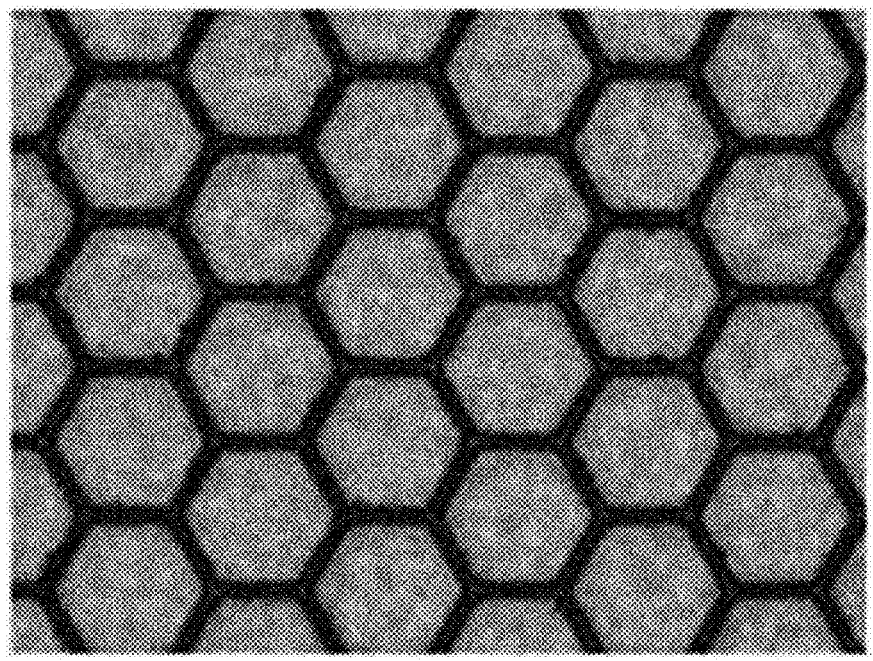
[Figure 19]
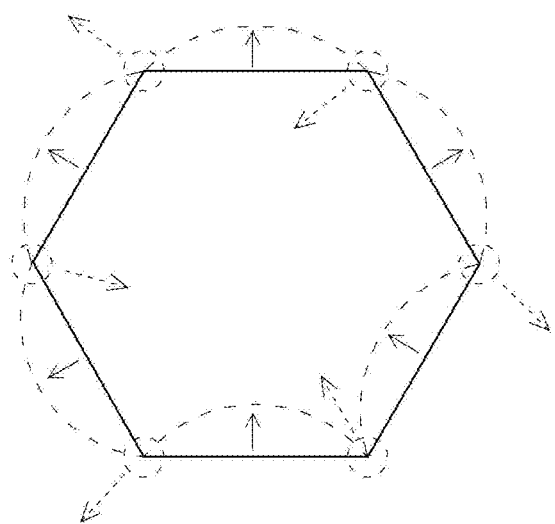

[Figure 20]
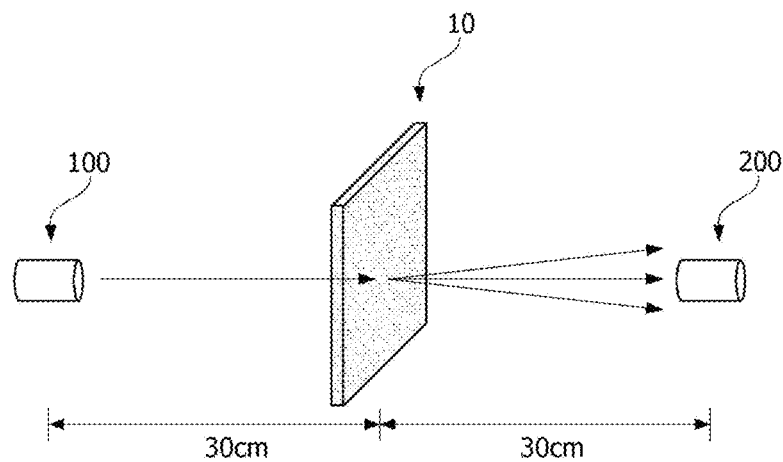
[Figure 21]
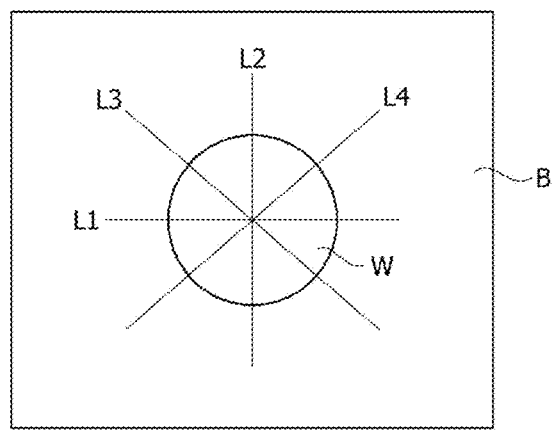

[Figure 22]
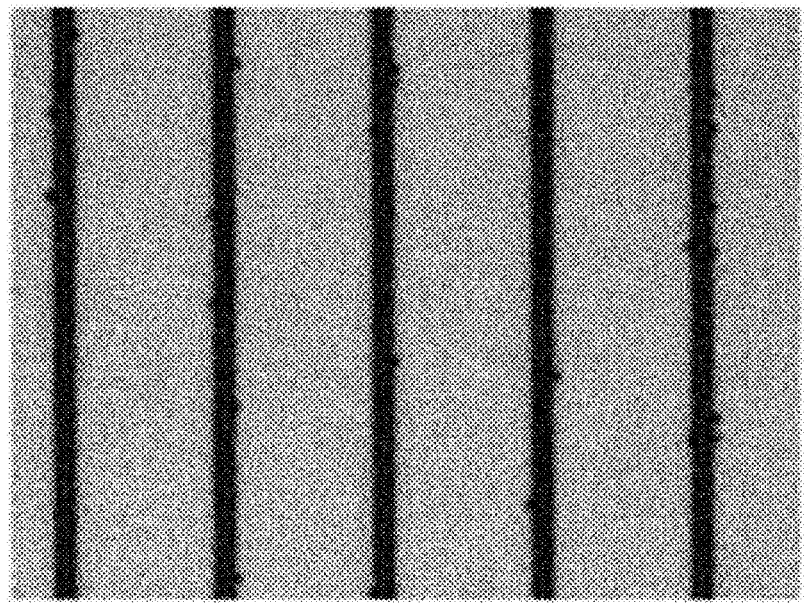
[Figure 23]
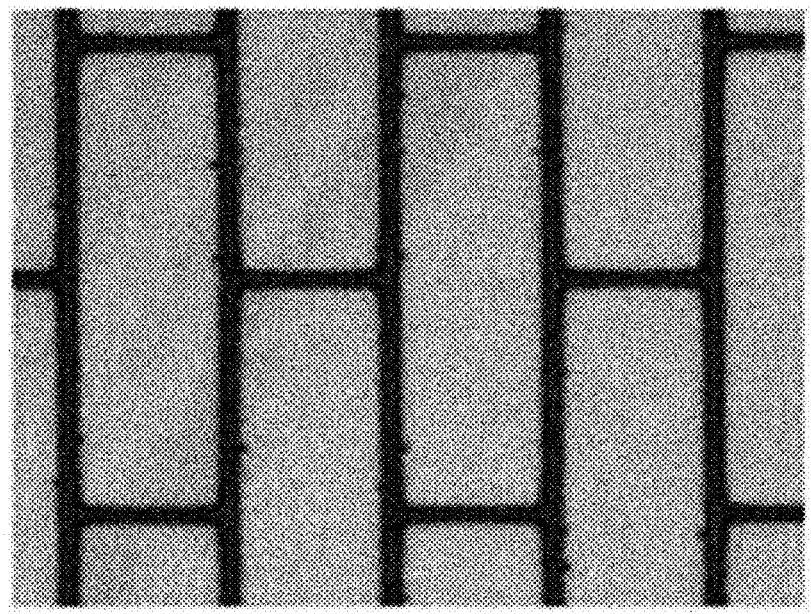

[Figure 24]
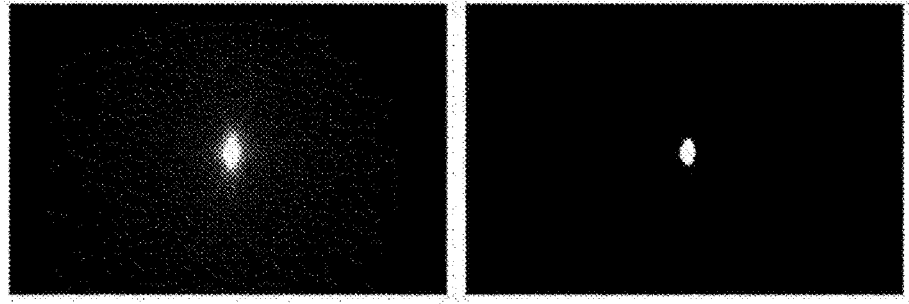
[Figure 25]
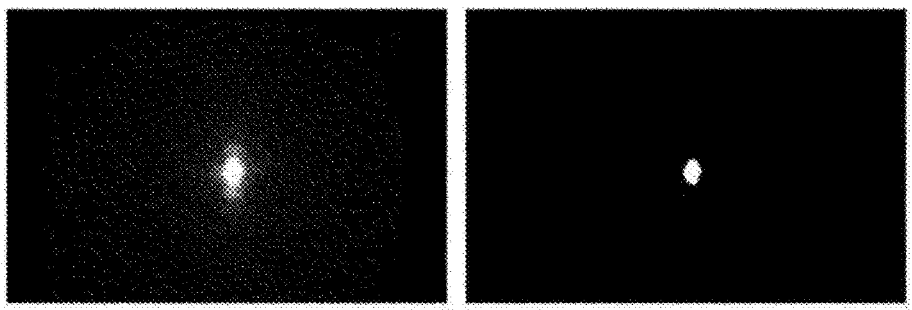
[Figure 26]
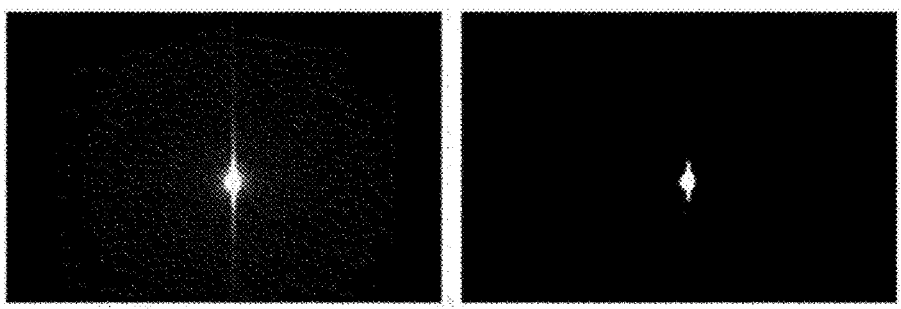
[Figure 27]
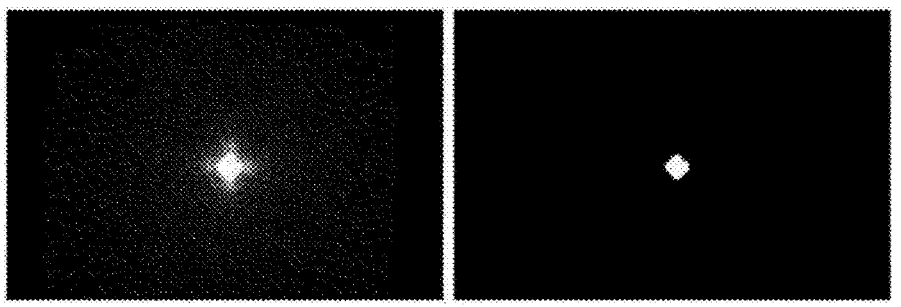

[Figure 28]
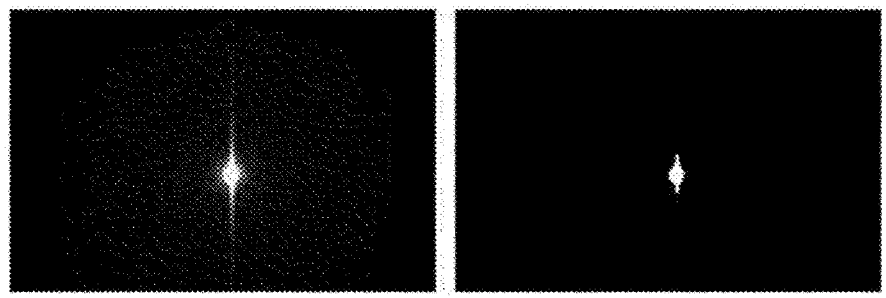
[Figure 29]
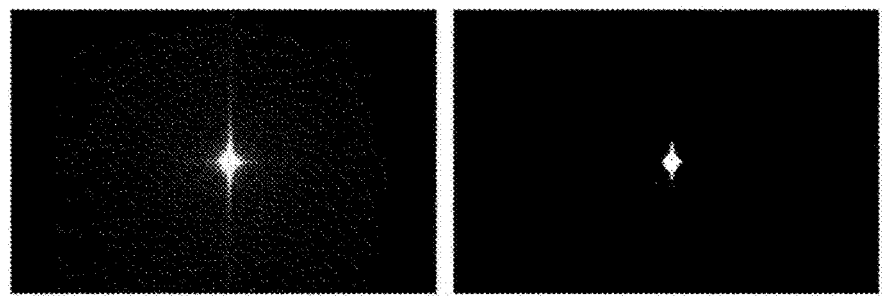
[Figure 30]
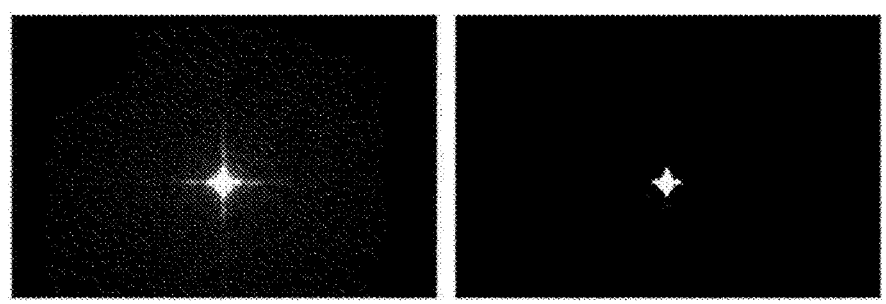

SUBSTRATE

CROSS REFERENCE TO RELATED APPLICATIONS

This application is a national phase entry under 35 U.S.C. § 371 of International Application No. PCT/KR2022/019790 filed Dec. 7, 2022, which claims the benefit of priority based on Korean Patent Application Nos. 10-2021-0175385, 10-2021-0175386, 10-2021-0175387 and 10-2021-0175389 dated Dec. 9, 2021, the disclosures of which are incorporated herein by reference in their entireties.

TECHNICAL FIELD

The present application relates to a substrate and a use thereof.

BACKGROUND ART

Optical devices configured to be capable of adjusting light transmittance, colors and/or reflectivity, and the like by disposing a light modulating material such as a liquid crystal compound or a mixture of a liquid crystal compound and a dye between two oppositely disposed substrates are known. In such a device, a so-called spacer is placed between the substrates to maintain a gap between the substrates.

As the spacer, so-called ball spacers and partition spacers are typically used.

The shape and placement of the spacer affects the performance of the optical device. For example, spacers having regular shapes and arrangements cause optical defects such as a diffraction phenomenon in some optical devices, which deteriorates optical performance such as visibility of the optical devices.

A method of solving the optical defect by irregularly arranging column spacers or the like may be considered. However, in this case, it is difficult to uniformly maintain the gap between the substrates in the optical device. The non-uniform gap between substrates also causes optical defects.

Also, the ball or column spacer is disadvantageous in terms of durability or mechanical properties, and the like of the optical device, and is also disadvantageous in configuring the optical device in a curved shape or configuring a flexible device.

In addition, the ball or column spacer is not advantageous in terms of securing adhesive force between the substrates and the like.

DISCLOSURE

Technical Problem

The present application provides a substrate comprising a spacer pattern. It is one object of the present application to provide a substrate, which is applied to various optical devices, capable of evenly and stably maintaining a gap between substrates while maximally securing an active region without causing any optical defects, including a diffraction phenomenon, and the like.

The present application is also intended to provide an optical device comprising the substrate.

Technical Solution

Among the physical properties mentioned in this specification, if the measurement temperature affects the result, the relevant physical property is a physical property measured at room temperature, unless otherwise specified. The term room temperature is a natural temperature without warming or cooling, which is usually one temperature in a range of about 10° C. to 30° C., or about 23° C. or about 25° C. or so. Also, in this specification, the unit of temperature is ° C., unless otherwise specified.

Among the physical properties mentioned in this specification, when the measurement pressure affects the result, the relevant physical property is a physical property measured at normal pressure, unless otherwise specified. The term normal pressure is a natural pressure without pressurizing or depressurizing, which generally refers to a pressure of about 1 atm or so, for example, a pressure of about 740 mmHg to 780 mmHg or so as the normal pressure.

Among the physical properties mentioned in this specification, if the measurement humidity affects the result, the relevant physical property is a physical property measured at humidity that is not separately adjusted at normal pressure and room temperature, unless otherwise specified.

The present application relates to a substrate. The substrate of the present application may comprise a base layer and a spacer pattern present on the base layer.

The present application can provide a substrate capable of evenly and stably maintaining a gap between substrates while maximally securing an active region of the optical device without causing any optical defects such as a diffraction phenomenon by controlling the shape of the spacer pattern.

It can be confirmed through an LED (light emitting diode) transmitted light analysis on the substrate whether or not the substrate exhibits an optical defect such as a diffraction phenomenon. In the transmitted light analysis, light with a wavelength of 550 nm is transmitted through the substrate using a circular LED light source with a diameter of about 3 mm, and then the transmitted light is received by a camera to obtain an image, and this image is converted to a black-and-white image, and then it is performed on the white image of the black-and-white image. The white image is an image obtained by irradiating the substrate with the LED light with a wavelength of 550 nm at a distance of 30 cm to be transmitted therethrough, and converting the image receiving the light transmitted through the substrate with a camera at a distance of 30 cm from the substrate to the black-and-white image. A method of obtaining such a white image is described in detail in the example section.

The substrate may exhibit a property that it has appropriate lengths of horizontal lines, vertical lines, and left and right diagonal lines of the white image in the black-and-white image of the transmitted light of the LED light with a wavelength of 550 nm. The horizontal line, the vertical line, and the left and right diagonal lines intersect at one point, and the angle between the lines may be equal to be 45 degrees. Also, one point where the horizontal line, vertical line, and left and right diagonal lines intersect may be the center point of the white image. The center point is a point where four parts appearing when the white image is divided into only the horizontal and vertical lines have substantially the same area, and here, the angle formed by the horizontal and vertical lines is 90 degrees. In addition, the length is the number of pixels of a portion where the white image in the camera receiving the transmitted light is present, which is dimensionless.

For example, the standard deviations of the lengths of horizontal lines, vertical lines, and left and right diagonal lines of the white image may be within a predetermined range. For example, the upper limit of the standard deviation may be 80, 75, 70, 65, 60, 55, 50, 45, 40, 35, 30, 25, 20, 15, 10, 5, or 3 or so, and the lower limit thereof may be 0, 5, 10, 15, 20, 25, 30, 35, 40, or 45 or so. The standard deviation may be less than or equal to, or less than any one of the above-described upper limits, or may be in a range of more than or equal to, or more than any one of the above-described lower limits while being less than or equal to, or less than any one of the above-described upper limits.

In this specification, the term standard deviation is a value calculated in the following manner, unless otherwise specified. For example, if there are n numerical values, first the squares of the differences between the respective numerical values and the arithmetic mean are summed. Subsequently, the sum value is divided by (n−1), and then the square root of the resulting value is defined as the standard deviation. For example, the standard deviation of 5, 6, 10, and 15 is obtained as follows. The arithmetic mean of the above values is 9, and thus the value summing the squares of the differences between the respective numerical values and the arithmetic mean is obtained as 62 (=$(5-9)^2+(6-9)^2+(10-9)^2+(15-9)^2$). Subsequently, the square root of the value (about 20.7) of 62 divided by 3 (=n−1) is taken, whereby 4.5, which is the relevant square root, can be defined as the standard deviation.

The average or average value referred to in this specification is an arithmetic average value, unless otherwise specified.

In the analysis, an average (arithmetic average) of the lengths of the horizontal line, vertical line, and left and right diagonal lines of the white image may be within a predetermined range. For example, the lower limit of the average of the lengths may be 200, 220, 240, 260, 280, or 300 or so, and the upper limit thereof may be 600, 580, 560, 540, 520, 500, 480, 460, 440, 420, 400, 380, 360, 340, 320, 300, 280, 260, or 250 or so. The average of the lengths may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In the analysis, the diffraction area ratio of the white image may be within a predetermined range. Here, the diffraction area ratio is a ratio (100%×A1/A2) of the area (A1) of the white image obtained by receiving the LED light transmitted through the substrate in the analysis to the area (A2) of the white image of the LED light. The area (A2) of the white image of the LED light means a white image when an image obtained by directly receiving the LED light with the camera without passing through the substrate has been converted into a black-and-white image.

The upper limit of the diffraction area ratio (100%×A1/A2) may be 300%, 280%, 260%, 240%, 220%, 200%, 180%, 160%, 140%, 120%, or 115% or so, and the lower limit thereof may be 100%, 110%, 120%, 130%, 140%, 150%, or 160% or so. The diffraction area ratio may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The lower limit of the ratio (A/L) of the diffraction area ratio (100%×A1/A2) (A) to the average (arithmetic average) (L) of the lengths of the horizontal line, vertical lines, and left and right diagonal lines of the white image of the LED transmitted light in the analysis may be 0.43, 0.44, 0.45, 0.46, 0.47, 0.48, 0.49, 0.5, 0.51, 0.52, 0.53, or 0.54 or so, and the upper limit thereof may be 10, 8, 6, 4, 2, 1, 0.9, 0.8, 0.7, 0.6, 0.5, or 0.45 or so. The unit of the ratio (A/L) is %. The ratio may be less than or equal to, or less than any one of the above-described upper limits, or may be in a range of more than or equal to, or more than any one of the above-described lower limits while being less than or equal to, or less than any one of the above-described upper limits.

When the substrate exhibits such characteristics, it can be evaluated that the relevant substrate does not exhibit optical defects such as a diffraction phenomenon. Such a substrate can be provided through control of the spacer pattern.

In the substrate, a spacer pattern is present on the base layer. The term spacer pattern means a formation form of spacers that is confirmed when observing the surface of the base layer on which spacers are formed. The pattern of these spacers may also be formed by two or more spacers that are distinct from each other, or may also be formed by one spacer.

The type of spacer forming the spacer pattern is not particularly limited. For example, the spacers may be so-called ball spacers, column spacers, and/or partition spacers.

By applying the partition spacer as the spacer, it is possible to maintain the gap between the substrates more effectively and stably, as intended, while preventing and resolving optical defects in the optical device through the configuration of various spacer patterns as described below.

The partition spacer is also advantageous in terms of securing durability or mechanical properties, and the like of the optical device and securing adhesive force between substrates, and for example, it is advantageous in terms of configuring an optical device in a curved shape or configuring a flexible device.

The term partition spacer, as is known, means a spacer in the form of a partition wall.

The spacer pattern may be adjusted to achieve good optical performance in the optical device.

The spacer pattern according to the first aspect of the present application may comprise non-linear line spacers. The non-linear line spacer may be the partition spacer.

The term line spacer means a partition spacer exhibiting a line shape when it is observed from the top (specifically, the surface of the substrate layer on which the spacer pattern is formed is observed along the normal direction of the surface).

The term non-linear line spacer means a line spacer whose actual length is longer than the length of the straight line connecting both ends of the relevant line in the line form. An exemplary form of such a non-linear line spacer is shown, for example, in FIG. 1.

In FIG. 1, the straight line connecting both ends of the line spacer is indicated by a dotted line of L1.

The non-linear line spacer may comprise a curved portion. The non-linear line spacer may be entirely formed in curves or may comprise some curved portions.

The non-linear line spacer may also comprise two or more types of curved portions having different curvatures.

The curved portion of the non-linear line spacer may have a curvature within a predetermined range. For example, the lower limit of the curvature may be 0R, 5R, 10R, 15R, 20R, 25R, 30R, 35R, 40R, 45R, 50R, 55R, 60R, 65R, 70R, 75R, 76R, 77R, 78R, 79R, or 80R or so, and the upper limit thereof may also be 100R, 95R, 90R, 89R, 88R, 87R, 86R, 85R, 84R, 83R, 82R, 81R, 80R, 79R, 78R, 77R, 76R, 75R, 74R, 73R, 72R, 71R, 70R, 69R, 68R, 67R, 66R, 65R, 64R, 63R, 62R, 61R, 60R, 59R, 58R, 57R, 56R, 55R, 54R, 53R, 52R, 51R, 50R, 45R, 40R, 35R, 30R, 25R, 20R, 15R, 10R, or 5R or so. The curvature may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits. In this specification, the unit R of curvature means μm. That is, for example, the matter that the curvature is 20R means that the curvature is the curved degree of the circle having a radius of 20 μm.

In the non-linear line spacer, $L_1/X$ of Equation 1 below may be within a predetermined range.

$$L_1/X \qquad \text{[Equation 1]}$$

In Equation 1, $L_1$ is the length of the straight line connecting both ends of the non-linear line spacer, and X is an interval between two straight lines parallel to the straight line of the length $L_1$, wherein the two straight lines contact the most protruding portions in the left and right directions of the non-linear line spacer. In Equation 1, $L_1$ and X have the same unit, and if the units are the same, the type of the unit is not limited.

The straight line of the length $L_1$ and two straight lines parallel to the straight line and contacting the most protruding portions in the left and right directions of the non-linear line spacer, which confirm Equation 1, are exemplarily indicated by dotted lines in FIG. 1.

In FIG. 1, the straight line connecting both ends of the line spacer is indicated by a dotted line of $L_1$; the straight line parallel to the straight line $L_1$ and contacting the left protrusion of the spacer is indicated by a dotted line of LL1; the straight line parallel to the straight line $L_1$ and contacting the right protrusion of the spacer is indicated by a dotted line of RL1; and the interval between the straight lines LL1 and RL1 is indicated by X.

The lower limit of $L_1/X$ in Equation 1 may be 250, 260, 270, 280, 290, 300, 310, or 320 or so, and the upper limit thereof may also be 1000, 950, 900, 850, 800, 750, 700, 650, 600, 550, 500, 490, 480, 460, 440, 420, 400, 380, 360, or 340 or so. The $L_1/X$ may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The low limit of interval (X in Equation 1) between two straight lines parallel to the straight line (the straight line of length $L_1$ in Equation 1) connecting both ends of the non-linear line spacer, wherein the two straight lines contact the most protruding portions in the left and right directions of the non-linear line spacer, may be 10 μm, 15 μm, 20 μm, 25 μm, 30 μm, 35 μm, 40 μm, 45 μm, 50 μm, or 55 μm or so, and the upper limit thereof may also be 200 μm, 190 μm, 180 μm, 170 μm, 160 μm, 150 μm, 140 μm, 130 μm, 120 μm, 110 μm, 100 μm, 95 μm, 90 μm, 85 μm, 80 μm, 75 μm, 70 μm, or 65 μm or so. The interval (X) may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The value of the interval (X in Equation 1) between two straight lines parallel to the straight line (the straight line of length $L_1$ in Equation 1) connecting both ends of the non-linear line spacer, wherein the two straight lines contact the most protruding portions in the left and right directions of the non-linear line spacer may be an average value. That is, when the spacer pattern includes a plurality of non-linear line spacers, the entire interval (X in Equation 1) of the plurality of non-linear line spacers may be within the above-described numerical range, or the average value of the entire interval (X in Equation 1) of the plurality of non-linear line spacers may be within the above-described numerical range.

The term average or average value as mentioned in this specification means the known arithmetic average.

When the numerical range is an average value, the upper limit of the standard deviation of the intervals (X in Equation 1) may be 5, 4.5, 4, 3.5, 2.5, or 2 or so, and the lower limit thereof may be 0, 0.5, 1, 1.5, or 2 or so. The standard deviation may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits. Here, the definition of the standard deviation is as described above.

When the non-linear line spacers are included in the spacer pattern, a pitch between them may be designed within an appropriate range depending on the purpose. The pitch between the non-linear line spacers is the pitch between the straight lines (straight lines of length $L_1$ in Equation 1) connecting both ends of the non-linear line spacers, which is exemplarily illustrated in FIG. 2. In FIG. 2, the pitch is indicated by P. If the straight lines connecting both ends of the non-linear line spacers are not parallel to each other, the average of the shortest distance(S) and the longest distance (L) between the straight lines, that is, (S+L)/2 may be defined as the pitch.

The lower limit of the pitch may be 100 μm, 150 μm, 200 μm, 250 μm, 300 μm, or 350 μm or so, and the upper limit thereof may also be 600 μm, 550 μm, 500 μm, 450 μm, or 400 μm or so. The pitch may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The desired effect can be efficiently achieved by configuring the spacer pattern with the non-linear line spacer having such a form.

A design method of the non-linear line spacer will be described with reference to the drawings as follows. It is explained with reference to FIG. 3. In order to design the non-linear line spacer, a so-called honeycomb shape in which regular hexagons are regularly arranged is first designed as shown in FIG. 3(*a*). At this time, the length of one side of the regular hexagon may be determined in consideration of a desired pitch. Then, the shapes as shown in FIG. 3(*b*) are designed by removing sides from the regular hexagons so that line shapes are generated.

As shown in FIG. 3(*c*), each point of the line shape is moved to have a predetermined irregularity degree. In FIG. 3(*c*), the movement of the respective points is indicated by dotted line arrows.

Here, the matter of moving them to have a predetermined irregularity degree will be described with reference to FIG. 4.

FIG. 4 shows only two adjacent points of the points belonging to one line among the respective points in the line form of FIG. 3(c), while omitting the straight line connecting the points. When the length of the straight line connecting the two points is P, the point is moved by designating a circular region having a radius of a length that is a constant ratio to the length of 0.5 times the length P based on the spot where one point exists, and setting a program so that the one point can move randomly within the region. For example, FIG. 4 schematically shows the form that the circular region having a radius of the length 0.5P, which is 0.5 times the length P, is set, and the point moves to an arbitrary spot within the region. At this time, when the radius of the circular region, which is the region where the point is moved, is 0.5P, the point is defined as being moved to have an irregularity degree of 100%. That is, the irregularity degree is determined according to the length of the radius of the set circular region. Specifically, if the length of the radius of the circular region is kP (where P is the length of the straight line connecting the two points), the irregularity degree is calculated as 100×(kP)/(0.5P).

In the kP above, k is an arbitrary number determined according to the length of the radius. For example, if the radius is ¼ times the straight-line length P, the k becomes 0.25, and if it is ½ times the straight-line length P, the k becomes 0.5.

In such a manner, the non-linear line spacer can be designed by moving all points belonging to one line to have a predetermined irregularity degree, and connecting the moved lines again.

The lower limit of the irregularity degree may be about 5%, about 10%, about 15%, about 20%, about 25%, about 30%, about 35%, about 40%, about 45%, about 50%, about 55%, about 60%, about 65%, about 70%, about 75%, about 80%, about 85%, or about 90% or so, and the upper limit thereof may be about 95%, about 90%, about 85%, about 80%, 75%, or 70% or so. The irregularity degree may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits. As the irregularity degree increases, the effect of suppressing optical defects such as the diffraction phenomenon tends to increase, but if the irregularity degree becomes excessively large according to the spacer pattern, the efficiency of maintaining the gap between the substrates by the spacer pattern may decrease, and an appearance defect of the substrate or the optical device to which the substrate is applied may occur. Therefore, an appropriate irregularity degree may be selected according to the pattern of the spacer.

In the process of designing the non-linear line spacer, the curvature may be given to the straight line connecting adjacent points together with the movement of the points, and such curvature may also be performed to have a predetermined irregularity degree. The meaning of giving the curvature to the straight line to have a predetermined irregularity degree is as follows. First, in the program, the lower limit of the curvature is set to 0R and the upper limit is set to 100R. Thereafter, the irregularity degree is designated and the designated irregularity degree is set to the upper limit, whereby the curvature may be given by setting a program so that an arbitrary curvature between the lower limit (0R) and the designated upper limit is given to the straight line. For example, if the curvature is given with an irregularity degree of 80%, the lower limit of the curvature is set to 0R and the upper limit of the curvature is set to 80R within the range of 0R to 100R, whereby the straight line is curved to optionally have any one value of curvature within the range of 0R to 80R.

In FIG. 3(c), the curving process is illustrated by a solid arrow.

The range of irregularity degrees giving the curvature may also be selected according to the purpose. For example, the lower limit of the irregularity degree may be 20%, 25%, 30%, 35%, 40%, 45%, 50%, 55%, 60%, 65%, 70%, 75%, 76%, 77%, 78%, 79%, or 80% or so, and the upper limit thereof may also be 89%, 88%, 87%, 86%, 85%, 84%, 83%, 82%, 81%, 80%, 75%, 70%, 65%, 60%, or 55% or so. The irregularity degree may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

A means for designing the spacers in such a manner is not particularly limited, and a known random number coordinate program, such as Minitab, CAD, MATLAB, STELLA, or Excel random number coordinate program, may be used.

In one example, the spacer pattern comprising the non-linear line spacers may further comprise a bridge connecting adjacent non-linear line spacers among the plurality of non-linear line spacers. The bridge also corresponds to the partition line spacer. For example, when another line spacer connecting two line spacers exists, the line spacer having the shortest length among the three line spacers may be defined as the bridge.

The spacer pattern of this type is shown in FIGS. 5 and 6.

One or more bridges may exist.

When a plurality of bridges exists, for example, they may exist so as to satisfy Equation 2 below.

$$0 \text{ mm} < G_1 \le 0.4 \times L_1 \qquad \text{[Equation 2]}$$

In Equation 2, $G_1$ is the gap between adjacent bridges (specifically, the gap between adjacent bridges among bridges existing within the gap between two adjacent non-linear line spacers, unit mm), and $L_1$ is the length (equal to $L_1$ in Equation 1 (unit: mm)) of the straight line connecting both ends of the non-linear line spacer.

In Equation 2, the method for obtaining the gap $G_1$ between bridges is the same as the method for obtaining the pitch between non-linear line spacers. That is, the pitch between straight lines connecting both ends of the bridges may be defined as the gap.

When the bridges exist (for example, when the bridges exist to satisfy Equation 2), the number of the relevant bridges may be adjusted so that a of Equation 3 below is within a predetermined range.

$$L_1 \times (m - 1) = a \times n \qquad \text{[Equation 3]}$$

In Equation 3, $L_1$ is the length (unit: mm) of the straight line connecting both ends of the non-linear line spacer or its average value (unit: mm), m is the number of the non-linear line spacers, and n is the number of bridges.

The lower limit of a satisfying Equation 3 may be 2, 3, 4, 5, 6, 8, 10, 12, 14, 16, or 18 or so, and the upper limit thereof may be 20, 18, 16, 14, 12, 10, 8, 6, 5, 4, or 3 or so. The a may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In another example, the bridges may also exist so that b in Equation 4 below satisfies a predetermined range.

$$0 \text{ mm} < G_1 \leq b \times L_1 \quad \text{[Equation 4]}$$

In Equation 4, $G_1$ is the gap between adjacent bridges among the plurality of bridges, and $L_1$ is the length (unit: mm) of the straight line connecting both ends of the non-linear line spacer or its average value (unit: mm).

The lower limit of b satisfying Equation 4 may be 0.001, 0.005, 0.01, 0.02, 0.03, 0.04, or 0.045 or so, and the upper limit thereof may be 0.5, 0.4, 0.3, 0.2, 0.1, 0.09, 0.08, 0.07, 0.06, 0.05, 0.04, 0.03, 0.02, or 0.015 or so. The b may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In Equation 4, the method for obtaining the gap $G_1$ between bridges is the same as in the case of Equation 2. In addition, when the bridges exist (for example, when the bridges exist to satisfy Equation 4), the number of the relevant bridges may be adjusted so that f of Equation 5 below is within a predetermined range.

$$L_1 \times (m - 1) = f \times n \quad \text{[Equation 5]}$$

In Equation 5, $L_1$ is the length (unit: mm) of the straight line connecting both ends of the non-linear line spacer or its average value (unit: mm), m is the number of the non-linear line spacers, and n is the number of bridges.

The lower limit of f satisfying Equation 5 may be 0.01, 0.05, 0.1, 0.5, 1, 1.5, 2, or 2.5 or so, and the upper limit thereof may also be 10, 9, 8, 7, 6, 5, 4, or 3 or so. The f may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

By arranging the bridges according to the above rule, it is possible to secure the desired performance of the substrate.

The bridge may have a straight shape or a curved shape having a curvature, and may also have a shape including curved portions and straight portions.

When the bridge has a curved shape or includes curved portions, the lower limit of the curvature (e.g., maximum curvature) of the curved shape or curved portion may be 20R, 25R, 30R, 35R, 40R, 45R, 50R, 55R, 60R, 65R, 70R, 75R, 80R, or 85R so, and the upper limit thereof may also be 90R, 85R, 80R, 75R, 70R, 65R, 60R, 55R, 50R, 45R, 40R, 35R, 30R, or 25R or so. The curvature (e.g., maximum curvature) may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The spacer pattern in which the bridges are formed may also be designed in the above-described manner, and exemplary details thereof are described in the examples of the present specification.

The spacer pattern according to a second aspect of the present application may also be in a form comprising a plurality of line spacers, wherein the plurality of line spacers crosses each other to form one or more closed figures. For example, the plurality of line spacers may cross each other to form a net shape, and accordingly, the closed figures may be formed.

In such a spacer pattern, the closed figure may be formed in one or a plurality of two or more.

At this time, the line spacers intersecting to form the closed figure or net shape may also be the non-linear line spacers of the first aspect as described above or may also be line spacers of a different type therefrom.

Spacer patterns in such a type are illustrated in FIGS. 7 to 10, and the like. Among the above, the pattern of FIG. 7 is a form in which the non-linear line spacers of the first aspect are crossed.

In one aspect of the spacer pattern in which the closed figures are formed, the line spacers may have at least a curved shape at some of intersections of the plurality of line spacers forming the closed figures (Condition 1). Examples of spacer patterns in such a shape are shown in FIGS. 8 and 10, and the like. Here, the line spacers may have a curved shape at all of the intersections, and may have at least a curved shape at some of the intersections.

For example, the lower limit of the ratio of the number of vertices at which the line spacer forms a curved shape among all vertices (intersections) of one of the closed figures may be 5%, 15%, 20%, or 23% or so, and the upper limit thereof may be 100%, 90%, 80%, 70%, 60%, 50%, 40%, 30%, or 20% or so. The ratio may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

Each of the closed figures formed in the spacer pattern shown in FIG. 8 has four vertices (intersections of line spacers), and the line spacers contacting at one vertex have a curved shape (i.e., the ratio is 25%).

In this case, the upper limit of the curvature of the curved shape may be 70R, 65R, 60R, 55R, or 50R or so, and the lower limit thereof may be 30R, 35R, 40R, 45R, or 50R or so. The curvature may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In one aspect of the spacer pattern in which the closed figures are formed, the length of the line spacer connecting at least some adjacent intersections among the intersections of the plurality of line spacers may be longer than the length of the straight line connecting the adjacent intersections (Condition 2). That is, it may have a relationship of (length of line spacer connecting adjacent intersections)>(length of virtual straight line connecting adjacent intersections).

Examples of spacer patterns in such a type are shown in FIGS. 7, 8, and 10, and the like.

For example, referring to FIG. 11, adjacent vertices (intersections) of each closed figure are indicated by V1 and V2, and the virtual straight line connecting the intersections V1 and V2 is indicated by a dotted line. In FIG. 11, the length of the line spacer connecting adjacent intersections is longer than the length of the virtual straight line connecting the adjacent intersections.

As one aspect of the case where Condition 2 is satisfied, the line spacers connecting adjacent intersections in the spacer pattern, that is, the line spacers forming the sides of the closed figure may have a curved shape. In this case, the curvature of the curved shape is adjusted according to the purpose, which is not particularly limited. For example, the upper limit of the curvature may be 95R, 90R, 85R, 80R, 75R, 70R, 65R, 60R, 55R, or 50R or so, and the lower limit thereof may be 5R, 10R, 15R, 20R, 25R, 30R, 35R, 40R, 45R, 50R, 55R, 60R, 65R, 70R, 75R, 80R, 85R, or 90R or so. The curvature may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits. In order to form a curved shape at the vertex as described above, a design method to be described below is applied.

In the spacer pattern including the closed figures, the closed figure may satisfy Equation 6 below (Condition 3). In another aspect, in a spacer pattern including the closed figures, the closed figure may not satisfy Equation 6 below (Condition 4).

$$A \neq 180 \times (n-2)/n \qquad \text{[Equation 6]}$$

In Equation 6, A is the interior angle of the closed figure formed by three adjacent intersections among the intersections forming the closed figure, and n is the number of intersections forming the closed figure.

In Equation 6, the interior angle of the closed figure formed by three adjacent intersections among the intersections forming the closed figure is the interior angle obtained by connecting the three intersections with straight lines.

If the closed figure satisfies Equation 6 above, it means that the figure formed by connecting the vertices constituting the closed figure with straight lines is not a regular polygon (in the case of a quadrangle, it means that it is not a square or rectangle), and if it does not satisfy Equation 6 above, it means that the figure formed by connecting vertices constituting the closed figure with straight lines is a regular polygon.

For example, referring to FIG. 12, FIG. 12(a) is a case where the closed figure does not satisfy Equation 6, and FIG. 12(b) is a case where it satisfies Equation 6.

In an aspect satisfying Condition 3 or 4, the lower limit of the interior angle (A in Equation 6) may be 10 degrees, 20 degrees, 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees, 170 degrees, 180 degrees, or 190 degrees or so, and the upper limit thereof may be 200 degrees, 190 degrees, 180 degrees, 170 degrees, 160 degrees, 150 degrees, 140 degrees, 130 degrees, 120 degrees, 110 degrees, 100 degrees, 90 degrees, 80 degrees, 70 degrees, 60 degrees, 50 degrees, 40 degrees, 30 degrees, or 20 degrees or so. The interior angle may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The spacer pattern including the closed figures may satisfy at least one of Conditions 1 to 4 above.

For example, the spacer pattern may satisfy at least Condition 1 above. The spacer pattern satisfying Condition 1 above may further satisfy Condition 2 above, if necessary.

For example, the spacer pattern may satisfy at least Condition 3 above. The spacer pattern satisfying Condition 3 above may further satisfy Condition 2 above, if necessary.

For example, the spacer pattern may satisfy Conditions 1 and 2 above. An aspect satisfying Conditions 1 and 2 above may further satisfy Condition 3 or 4 above. An aspect satisfying Conditions 1 to 3 is illustrated in FIG. 10, and an aspect satisfying Conditions 1, 2 and 4 is illustrated in FIG. 8.

For example, the spacer pattern may satisfy at least Condition 3, and this aspect is illustrated in FIGS. 9 and 10.

For example, the spacer pattern may satisfy at least Conditions 2 and 4 above, and this aspect is illustrated in FIG. 7.

In one example, the opposite sides among sides of the closed figure in the spacer pattern including the closed figures (pattern satisfying one or more of Conditions 1 to 4) may be curved in the same direction (Condition 5). Such a case is usually the case where the number of intersections is an even number, but is not limited thereto. In particular, the desired effect can be more appropriately satisfied by designing the aspect satisfying Conditions 1 and 2 above, particularly the aspect satisfying Conditions 1, 2 and 4 above as described above.

When Condition 5 is satisfied, a curvature difference between line spacers in a curved shape formed by opposite sides bent in the same direction may be within an appropriate range. When the curvature of one of the facing spacers is R1 and the curvature of the other is R2, the curvature difference is an absolute value of a value calculated in the manner of 100%×(R1-R2)/R2. The lower limit of the absolute value of such a curvature difference may be 5%, 4.5%, 4%, 3.5%, 3%, 2.5%, 2%, 1.5%, 1%, or 0.5% or so, and the upper limit thereof may be 0% or so. The absolute value of the difference may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

When Condition 5 is satisfied, the upper limit of the standard deviation of the straight-line distances between vertices forming the sides of the single closed figure may be 2, 1.5, 1, 0.5, 0.1, or 0.05 or so, and the lower limit thereof may be 0. The absolute value of the standard deviation may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

When Condition 5 is satisfied, the line spacers connecting adjacent intersections in the spacer pattern, that is, the line spacers forming the sides of the closed figure may have a curved shape. In this case, the curvature of the curved shape is adjusted according to the purpose, which is not particularly limited. For example, the upper limit of the curvature may be 70R, 65R, 60R, 55R, or 50R or so, and the lower limit thereof may be 30R, 35R, 40R, 45R, or 50R or so. The curvature may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In such a case, the line spacer in the curved shape may have one curvature center, or may have a curved shape forming the curvature center in the same direction based on the line spacer.

Here, the matter that the line spacer has one curvature center means a case where the line spacer has a constant curved degree between the adjacent vertices and only one curvature center is formed.

The matter that the line spacer has a curved shape forming the curvature center in the same direction based on the line spacer means a case where only one curvature center is formed, and a case where even if two or more curvature centers are present because the curved degree of the line spacer between the adjacent vertices is not constant, all the plurality of curvature centers exist on any one of the left side, right side, upper portion, and lower portion of the line spacer based on the line spacer.

For example, the case of FIG. 13(a) is a case of having the one curvature. Also, FIG. 13(b) is a case where because the curved directions of the line spacer differ between the adjacent vertices, two curvature centers thus formed are formed one by one on the left side and right side of the line spacer, respectively.

By constituting such a form, it is possible to secure the desired effect more advantageously.

In the spacer pattern including the closed figures (pattern satisfying one or more of Conditions 1 to 5 above), the lower limit of the number of intersections (i.e., vertices of the closed figure) forming a single closed figure in the net shape may be 3, 4, 5, or 6, and the upper limit thereof may also be 10, 9, 8, 7, 6, 5, or 4. The number of intersections (i.e., vertices of the closed figure) may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In the spacer pattern including the closed figures (pattern satisfying one or more of Conditions 1 to 5 above), the lower limit of the interval between adjacent intersections (for example, the interval between two intersections forming the side of the closed figure) may be 100 μm, 150 μm, 200 μm, 250 μm, 300 μm, or 350 μm or so, and the upper limit thereof may be 1000 μm, 950 μm, 900 μm, 850 μm, 800 μm, 750 μm, 700 μm, 650 μm, 600 μm, 550 μm, 500 μm, 450 μm, 400 μm, or 350 μm or so. The interval may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In the spacer pattern including the closed figures, it may be formed to have a predetermined area relationship with the closed figure (Condition 6).

For example, in Condition 6, the lower limit of the average of the areas of the closed figures in the spacer pattern may be 0.01 mm$^2$, 0.05 mm$^2$, 0.1 mm$^2$, 0.15 mm$^2$, 0.2 mm$^2$, 0.25 mm$^2$, 0.3 mm$^2$, 0.35 mm$^2$, 0.4 mm$^2$, 0.45 mm$^2$, 0.5 mm$^2$, 0.55 mm$^2$, 0.6 mm$^2$, 0.65 mm$^2$, 0.7 mm$^2$, 0.75 mm$^2$, 0.8 mm$^2$, or 0.85 mm$^2$ or so, and the upper limit thereof may also be 2 mm$^2$, 1.9 mm$^2$, 1.8 mm$^2$, 1.7 mm$^2$, 1.6 mm$^2$, 1.5 mm$^2$, 1.4 mm$^2$, 1.3 mm$^2$, 1.2 mm$^2$, 1.1 mm$^2$, 1 mm$^2$, 0.95 mm$^2$, 0.9 mm$^2$, 0.85 mm$^2$, 0.8 mm$^2$, 0.75 mm$^2$, 0.7 mm$^2$, 0.65 mm$^2$, 0.60 mm$^2$, 0.55 mm$^2$, 0.50 mm$^2$, 0.45 mm$^2$, 0.4 mm$^2$, 0.35 mm$^2$, 0.3 mm$^2$, 0.25 mm$^2$, or 0.2 mm$^2$ or so. The average of the areas may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits. The average of the areas is an arithmetic average of the areas of all closed figures included in the spacer pattern. When the spacer pattern is formed according to the design method as described below, the arithmetic average of the areas of some closed figures randomly selected from the closed figures existing in the pattern by the spacer pattern formation logic may be regarded as the arithmetic average value of the areas of all the closed figures. For example, when the spacer pattern formed by the design method as described below includes at least 10,000 or more closed figures, 1% (100) closed figures of the relevant closed figures are randomly selected to obtain the arithmetic average of the areas of the respective closed figures, which may be regarded as the arithmetic average value of the areas of all the closed figures.

When the average value of the areas of the closed figures is within the above range, the upper limit of the standard deviation of the areas of the closed figures may be 50, 45, 40, 35, 30, 25, 20, 15, 10, 9.5, 9, 8.5, 8, 7.5, 7, 6.5, 6, 5.5, 5, 4.5, 4, 3.5, 3, 2.5, 2, 1.5, 1, 0.8, 0.6, 0.4, 0.2, 0.1, 0.08, 0.06, or 0.04 or so, and the lower limit thereof may also be 0, 0.01, 0.03, 0.05, 0.07, 0.09, 0.1, or 0.15 or so. The standard deviation may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In the spacer pattern satisfying Condition 6, the average value (arithmetic average) of the areas of 9 adjacent closed figures among the closed figures included in the pattern may be adjusted within a certain range. The 9 adjacent closed figures are an arbitrary closed figure (central closed figure) selected from the spacer pattern and 8 closed figures directly surrounding the closed figure. Here, the matter of directly surrounding the closed figure means a case where no other closed figure exists between the eight closed figures and the central closed figure.

A method of selecting the 9 adjacent closed figures will be described with reference to FIG. 14. FIG. 14 is an example of a spacer pattern including closed figures in a net form formed by line spacers crossing each other, and each closed figure in the pattern is sequentially numbered. Among the closed figures numbered in FIG. 14, the 9 closed figures selected in this way are closed figures of 1, 2, 3, 11, 12, 13, 21, 22 and 23, closed figures of 4, 5, 6, 14, 15, 16, 25, 26 and 27, or closed figures of 8, 9, 10, 18, 19, 20, 28, 29 and 30.

The lower limit of the average of the areas of the 9 adjacent closed figures may be 0.01 mm$^2$, 0.05 mm$^2$, 0.1 mm$^2$, 0.15 mm$^2$, 0.2 mm$^2$, 0.25 mm$^2$, 0.3 mm$^2$, 0.35 mm$^2$, 0.4 mm$^2$, 0.45 mm$^2$, 0.5 mm$^2$, 0.55 mm$^2$, 0.6 mm$^2$, 0.65 mm$^2$, 0.7 mm$^2$, 0.75 mm$^2$, 0.8 mm$^2$, or 0.85 mm$^2$ or so, and the upper limit thereof may also be 2 mm$^2$, 1.9 mm$^2$, 1.8 mm$^2$, 1.7 mm$^2$, 1.6 mm$^2$, 1.5 mm$^2$, 1.4 mm$^2$, 1.3 mm$^2$, 1.2 mm$^2$, 1.1 mm$^2$, 1 mm$^2$, 0.95 mm$^2$, 0.9 mm$^2$, 0.85 mm$^2$, 0.8 mm$^2$, 0.75 mm$^2$, 0.7 mm$^2$, 0.65 mm$^2$, 0.60 mm$^2$, 0.55 mm$^2$, 0.50 mm$^2$, 0.45 mm$^2$, 0.4 mm$^2$, 0.35 mm$^2$, 0.3 mm$^2$, 0.25 mm$^2$, or 0.2 mm$^2$ or so. The average of the areas may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The upper limit of the standard deviation of the 9 adjacent closed figures may be 50, 45, 40, 35, 30, 25, 20, 15, 10, 9.5, 9, 8.5, 8, 7.5, 7, 6.5, 6, 5.5, 5, 4.5, 4, 3.5, 3, 2.5, 2, 1.5, 1, 0.8, 0.6, 0.4, 0.2, 0.1, 0.08, 0.06, or 0.04 or so, and the lower limit thereof may also be 0, 0.01, 0.03, 0.05, 0.07, 0.09, 0.1, or 0.15 or so. The standard deviation may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

When Condition 6 is satisfied, the lower limit of the ratio (B/A) of the average (B) of the areas of all closed figures to the average (A) of the areas of the 9 adjacent closed figures may be 0.5, 0.7, 0.9, or 0.95, and the upper limit may be 1.5, 1.4, 1.3, 1.2, 1.1, or 1.05 or so. The ratio may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The spacer pattern satisfying Condition 6 above may be a spacer pattern satisfying any one or two or more of Conditions 1 to 5 above.

The spacer pattern including the closed figure may be designed in the following manner.

For example, in order to form the pattern shown in FIG. 8, the sides are curved by a method of first forming a pattern as shown in FIG. 15 with straight-line line spacers, and giving a curvature to the sides of the respective closed figures in the relevant pattern while giving the above-described irregularity degree thereto, whereby it is possible to form the desired pattern. At this time, the irregularity degree is determined in consideration of the desired curvature.

Such a process is shown in FIG. 16. The pattern on the left side of FIG. 16 is the pattern of FIG. 15, and the pattern on the right side is an example of giving the curvature to each side of the pattern. The directions in which the sides are curved by giving the curvature thereto are indicated by arrows in FIG. 16. In this process, based on one vertex, both sides connected to the vertex are bent in the same direction, and at this time, if the same curvature is given, a pattern in which the line spacer is a curved line at the above-mentioned vertex can also be obtained, but the method of giving the curved line is not limited thereto.

For example, the spacer pattern shown in FIG. 7 can be designed by designing two non-linear line spacer patterns shown in FIGS. 1 and 2 and then crossing the two designed patterns with each other. The actual photograph of the line spacers designed in the manner shown in FIGS. 1 and 2 is shown in FIG. 17.

For example, in the spacer pattern shown in FIG. 9, a pattern including regular rectangles as shown in FIG. 15 is formed, and then the respective vertices of the rectangles in the pattern are moved by the method of giving the above-described irregularity degree (the method illustrated in FIG. 4) to reconstruct the pattern, whereby the desired pattern can be formed.

In this case, the lower limit of the given irregularity degree may be about 5%, about 10%, about 15%, about 20%, about 25%, about 30%, about 35%, about 40%, about 45%, about 50%, about 55%, about 60%, about 65%, about 70%, about 75%, about 80%, about 85%, or about 90% or so, and the upper limit thereof may be about 95%, about 90%, about 85%, about 80%, about 75%, or about 70% or so. The irregularity degree may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits. If the irregularity degree is given excessively high in the above process, it is difficult to form closed figures satisfying Condition 6 above.

For example, in the spacer pattern illustrated in FIG. 10, as shown in FIG. 18, a so-called honeycomb pattern is designed in which regular hexagonal closed figures are regularly arranged, and the sides of each single closed figure in the regular hexagonal shape are curved by the method of giving an arbitrary irregularity degree, whereby the pattern can be formed. Here, the initial shape has been illustrated as the regular hexagon, but the shape does not necessarily have to be the regular hexagon, and other shapes such as a regular triangle, a square, or a regular pentagon may also be applied. If necessary, each vertex of the hexagon may also be moved by giving the above-described irregularity degree together with the irregularity degree for the curved line formation. FIG. 19 is an example of such a design method, where in FIG. 19, movement of vertices is indicated by dotted arrows, and the curved line formation is indicated by solid arrows.

The lower limit of the irregularity degree for the curved line formation may be about 5%, about 10%, about 15%, about 20%, about 25%, about 30%, about 35%, about 40%, about 45%, about 50%, about 55%, about 60%, about 65%, about 70%, about 75%, about 80%, about 85%, or about 90% or so, and the upper limit thereof may be about 95%, about 90%, about 85%, about 80%, about 75%, or about 70% or so. The irregularity degree may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

The lower limit of the irregularity degree given for the movement of the vertices may be about 5%, about 10%, about 15%, about 20%, about 25%, about 30%, about 35%, about 40%, about 45%, about 50%, about 55%, about 60%, about 65%, about 70%, about 75%, about 80%, about 85%, or about 90% or so, and the upper limit thereof may be about 95%, about 90%, about 85%, about 80%, about 75%, or about 70% or so. The irregularity degree may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

If the irregularity degree is given excessively high in the above process, it is difficult to form closed figures satisfying Condition 6 above.

The line width and height of the line spacers forming the spacer patterns (patterns of the first and second aspects) are controlled according to the purpose, which are not particularly limited.

For example, the lower limit of the height of the line spacer may be 0.5 µm, 1 µm, 1.5 µm, 2 µm, 2.5 µm, 3 µm, 3.5 µm, 4 µm, 4.5 µm, 5 µm, 5.5 µm, or 6 µm or so, and the upper limit thereof may be 100 µm, 90 µm, 80 µm, 70 µm, 60 µm, 50 µm, 40 µm, 30 µm, 20 µm, or 10 µm or so. The height may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

For example, the lower limit of the line width of the line spacer may be 2 µm, 4 µm, 6 µm, 8 µm, 10 µm, 12 µm, or 14 µm or so, and the upper limit may also be 200 µm, 180 µm, 160 µm, 140 µm, 120 µm, 100 µm, 80 µm, 60 µm, 40 µm, or 20 µm or so. The line width may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

In the substrate of the present application, all the spacer patterns formed on the base layer may be the spacer pattern of the first aspect or the second aspect, or at least a part of the spacer patterns may be the spacer pattern of the first or second aspect. For example, the lower limit of the ratio of the area of the spacer pattern of the first or second aspect to the total area occupied by the spacer patterns formed on the base layer may be 50%, 55%, 60%, 65%, 70%, 75%, 80%, 85%, 90%, or 95% or so, and the upper limit thereof may be 100% or so. The ratio may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits.

Such a spacer pattern of the present application can maintain the gap between substrates evenly and stably without causing the optical defects while maximally securing the active region of the optical device.

Here, the active region generally means a portion, where the spacer pattern is not formed, of the total area of the base layer. Since a light modulating material such as a liquid crystal material is present in such a portion, the region without the spacer pattern where the light modulating material such as the liquid crystal material is present in the optical device may be the active region.

For example, in the substrate of the present application, the lower limit of the ratio of the area occupied by the spacer pattern to the area of the entire substrate (base layer) may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% or so, and the upper limit thereof may be 50%, 45%, 40%, 35%, 30%, 25%, 20%, 15%, or 10% or so. The ratio may be less than or equal to, or less than any one of the above-described upper limits, or may be more than or equal to, or more than any one of the above-described lower limits, or may be in a range of more than or equal to, or more than any one of the above-described lower limits while being less than or equal to, or less than any one of the above-described upper limits. This area may also be referred to as an aperture ratio in this specification.

The spacer pattern on the substrate of the present application may be any one of the above-described patterns or a combination of two or more thereof, and other types of spacers or other types of spacer patterns may also be present on the substrate as long as the occupied area is achieved.

In one example, the spacer pattern may comprise ball spacers together with the partition spacer. Such ball spacers may be attached to the partition spacer or may be embedded therein. The ball spacer is a circular spacer in a usual meaning known in the industry.

The spacer pattern in the above type can be manufactured in a manner to be described below, thereby forming a spacer pattern exhibiting excellent dimensional uniformity and adhesiveness to the base layer simultaneously. However, the ball spacer does not correspond to the essential components of the present application.

The spacer pattern may be manufactured by applying, for example, a usual binder used for manufacturing partition wall-shaped spacers. The partition wall-shaped spacers are usually manufactured by pattern-exposing a binder, in which an ultraviolet curable compound is mixed with an initiator that initiates curing of the compound, and the like, as a photosensitive binder. In the present application, such a material may also be applied. In this case, the cured product of the ultraviolet curable compound may form the partition wall. The specific type of the ultraviolet curable compound is not particularly limited, and for example, an acrylate-based polymer material or an epoxy-based polymer, and the like may be used, without being limited thereto. Various types of binders from which partition walls can be manufactured are known in the industry.

In the present application, when ball spacers are applied, the type of the ball spacer is not particularly limited, where an appropriate type may be selected from known ball spacers and used.

The specific average particle diameter range of the ball spacers is not particularly limited, where they may have an average particle diameter within a range satisfying the above-described ratio range according to the dimension of the partition wall.

The above-described spacer pattern may be a black pattern or a transparency pattern.

The term transparency mentioned in this specification means a case where it has transmittance of at least a certain level or more. For example, the term transparency means that the transmittance is approximately 70% or more, 75% or more, 80% or more, 85% or more, or 90% or more. The upper limit of the transmittance in the transparency state is not particularly limited, which may be, for example, about 100% or less, or about 99% or less or so. The transmittance is transmittance for visible light, which may be, for example, transmittance for any one of wavelengths within a range of about 380 nm to 700 nm, or average transmittance for the entire light within the range.

The term black spacer pattern may mean a pattern whose optical density is measured within a range of 1.5 to 4. The optical density may be obtained by measuring the transmittance (unit: %) of the spacer pattern or the transmittance (unit: %) of a layer including the same component, and then assigning it to the optical density equation (optical density=−log 10(T), where T is the transmittance). Here, the layer including the same components as those of the spacer pattern may be formed by a method, such as coating, deposition, or plating. At this time, the thickness of the formed layer may be about 12 µm or so. For example, in the scope of the black spacer pattern, a case where the optical density of the layer with a thickness of about 12 µm or so is in the above-mentioned range, or the optical density of the actual spacer pattern is in the range, or the value obtained by converting the optical density of the layer with a thickness of about 12 µm or so in consideration of the thickness of the actual black spacer pattern is in the range may be included.

Various materials capable of forming the black or transparent spacer pattern are known, where all of these known materials can be applied in the present application.

For example, the black spacer pattern can be manufactured, for example, by adding a component (a darkening material) capable of realizing black to the above-described material (e.g., the above-described binder, etc.) that is typically applied to form spacers.

Therefore, the spacer pattern may comprise a pigment or dye, and the like capable of darkening, and may comprise, specifically, metal oxide, metal nitride, metal oxynitride, carbon black, graphite, an azo-based pigment, a phthalocyanine pigment, or a carbon-based material, and the like. Here, in the applicable darkening material, chromium oxide (CrxOy, etc.) or copper oxide (CuxOy, etc.), and the like may be exemplified as the metal oxide, and aluminum oxynitride (AlxOyNz, etc.), and the like may be exemplified as the metal oxynitride, without being limited thereto. In addition, as the carbon-based material, porous carbon such as carbon nanotubes (CNT), graphene, and activated carbon, and the like may be exemplified, but is not limited thereto.

For example, the black spacer pattern may be manufactured by blending the material (e.g., carbon-based material) with the above-described binder and then curing it, or applying the material itself to deposition or plating, and the like in an appropriate manner.

In the present application, the types of the usable pigments or dyes, and the like are not limited thereto, where appropriate types may be selected according to the desired darkening (optical density), and the like, and the ratio may also be selected in consideration of the darkening, and the like.

As the base layer of the substrate, any base layer used as a substrate in constituting a known optical device such as, for example, an LCD (liquid crystal display) or an OLED (organic light emitting device) may be applied without particular limitation. For example, the base layer may be an inorganic base layer or an organic base layer. A glass base layer may be exemplified as the inorganic base layer, and various plastic films may be exemplified as the organic base layer. The plastic film may be exemplified by a TAC (triacetyl cellulose) film; a COP (cyclo olefin copolymer) film such as a norbornene derivative; an acrylic film such as PMMA (poly(methyl methacrylate)); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (poly ether sulfone) film; a PEEK (polyetheretherketon) film; a PPS (polyphenylsulfone) film, a PEI (polyetherimide) film; a PEN (polyethylenemaphthatlate) film; a PET (polyethyleneterephtalate) film; a PI (polyimide) film; a PSF (polysulfone) film, or a PAR (polyarylate) film, and the like, but is not limited thereto.

In the present application, the thickness of the base layer is not particularly limited, where an appropriate range may be selected according to the purpose.

The substrate of the present application may comprise other elements required for driving the optical device in addition to the base layer and the spacer pattern. These elements are variously known, and typically, there is an electrode layer or the like. In one example, the substrate may further comprise an electrode layer between the base layer and the spacer pattern. As the electrode layer, a known material may be applied. For example, the electrode layer may comprise a metal alloy, an electrically conductive compound, or a mixture of two or more of the foregoing. Such a material may be exemplified by metals such as gold, CuI, an oxide material such as ITO (indium tin oxide), IZO (indium zinc oxide), ZTO (zinc tin oxide), zinc oxide doped with aluminum or indium, magnesium indium oxide, nickel tungsten oxide, ZnO, $SnO_2$ or $In_2O_3$, or a metal nitride such as gallium nitride, a metal selenide such as zinc selenide, a metal sulfide such as zinc sulfide, and the like. The transparent hole-injecting electrode layer may also be formed using a laminate of a metal thin film such as Au, Ag or Cu and a high refractive transparent material such as ZnS, $TiO_2$ or ITO.

The electrode layer may be formed by any means such as vapor deposition, sputtering, chemical vapor deposition or electrochemical means. Patterning of the electrode layer is also possible in a known manner without particular limitation, and it may also be patterned through, for example, the known photolithography or a process using a shadow mask and the like.

The substrate of the present application may further comprise an alignment film present on the base layer and the spacer pattern.

Another exemplary substrate of the present application may comprise: a base layer; the spacer pattern present on the base layer; and an alignment film formed on the base layer and the spacer pattern.

The type of alignment film formed on the base layer and the spacer pattern is not particularly limited, and a known alignment film, for example, a known rubbing alignment film or a photo-alignment film may be applied.

A method of forming the alignment film on the base layer and the spacer pattern, and performing an orientation treatment thereon also follows a known method.

In one example, the substrate may comprise a protective film as a further constitution. For example, the substrate may further comprise a protective pressure-sensitive adhesive film attached to the surface of the base layer on which the spacer pattern is formed. In such a constitution, a known protective pressure-sensitive adhesive film may be used as the pressure-sensitive adhesive film without particular limitation.

As the substrate is applied to an optical device, it is possible to secure uniform and excellent optical performance without causing unnecessary diffraction phenomena and the like.

The present application also relates to an optical device formed using the substrate.

An exemplary optical device of the present application may comprise the substrate and a second substrate disposed opposite to the substrate and maintaining the gap from the substrate by the spacer of the substrate.

In the optical device, a light modulation layer may be present in the gap between the two substrates. In the present application, the term light modulation layer may include all types of known layers capable of changing at least one characteristic among characteristics such as polarization state of incident light, transmittance, color tone and reflectance according to the purpose.

For example, the light modulation layer is a layer containing a liquid crystal material, which may be a liquid crystal layer switching between a diffusion mode and a transparent mode by on-off of a voltage, for example, a vertical electric field or a horizontal electric field, or may be a liquid crystal layer switching between a transparent mode and a blocking mode, or may be a liquid crystal layer switching between a transparent mode and a color mode, or a liquid crystal layer switching between color modes of different colors.

Light modulation layers capable of performing such functions, for example, liquid crystal layers, are variously known. As one exemplary light modulation layer, it is possible to use a liquid crystal layer used in a usual liquid crystal display. In another example, the light modulation layer may also be various types of so-called guest host liquid crystal layers, polymer dispersed liquid crystal layers, pixel-isolated liquid crystal layers, suspended particle devices, or electrochromic displays, and the like.

Here, the polymer dispersed liquid crystal layer (PDLC) is a high-level concept including so-called PILC (pixel isolated liquid crystal), PDLC (polymer dispersed liquid crystal), PNLC (Polymer Network Liquid Crystal) or PSLC (Polymer Stabilized Liquid Crystal), and the like. The polymer dispersed liquid crystal layer (PDLC) may comprise, for example, a polymer network and a liquid crystal region including a liquid crystal compound dispersed in a phase-separated state from the polymer network.

The implementation method or form of such a light modulation layer is not particularly limited, where a known method may be adopted without limitation according to the purpose.

In addition, the optical device may further comprise additional known functional layers, for example, a polarization layer, a hard coating layer and/or an antireflection layer, and the like, if necessary.

Advantageous Effects

The present application provides a substrate comprising a spacer pattern.

The present application can provide a substrate, which is applied to various optical devices, capable of evenly and stably maintaining a gap between substrates while maximally securing an active region without causing any optical defects, including a diffraction phenomenon, and the like. The present application can also provide an optical device comprising the substrate.

DESCRIPTION OF DRAWINGS

FIGS. 1 and 2 are diagrams of exemplary spacer patterns of the present application.

FIG. 3 is exemplary diagrams showing a process of forming the spacer pattern of FIG. 17.

FIG. 4 is an exemplary diagram for explaining a process of forming a spacer pattern of the present application.

FIGS. 5 to 7 are views of exemplary spacer patterns of the present application.

FIG. 8 is a view of an exemplary spacer pattern of the present application.

FIG. 9 is a view of an exemplary spacer pattern of the present application.

FIG. 10 is a view of an exemplary spacer pattern of the present application.

FIG. 11 is exemplary diagrams for explaining spacer patterns satisfying Condition 2.

FIG. 12 is exemplary diagrams for explaining spacer patterns satisfying Condition 3 or 4.

FIG. 13 is exemplary diagrams for description of Condition 5.

FIG. 14 is an exemplary diagram for explaining a process of calculating an area of a closed figure of an exemplary spacer pattern of the present application.

FIG. 15 is a view of a spacer pattern of a comparative example.

FIG. 16 is an example of a curving process for forming a spacer pattern.

FIG. 17 is a view of an exemplary spacer pattern of the present application.

FIG. 18 is an exemplary view for explaining a process of forming the spacer pattern of FIG. 10.

FIG. 19 is an exemplary diagram for explaining a process of forming a spacer pattern.

FIG. 20 is a diagram for explaining a diffraction test performed on a substrate of the present application as a schematic diagram.

FIG. 21 is a diagram showing a method of measuring a size of a diffraction pattern of a white image.

FIG. 22 is a view of a spacer pattern of a comparative example.

FIG. 23 is a view of a spacer pattern of a comparative example.

FIGS. 24 to 27 are results of diffraction tests performed on examples.

FIGS. 28 to 30 are results of diffraction tests performed on comparative examples.

MODE FOR INVENTION

Hereinafter, the present application is specifically described through Examples, but the scope of the present application is not limited by the following examples.

1. Diffraction Pattern Analysis of Substrate (Transmitted Light Analysis of LED Light)

Diffraction patterns were analyzed for the respective substrates (structure of base layer/ITO (indium tin oxide) electrode layer/spacer pattern) prepared in Examples or Comparative Examples. The diffraction pattern analysis was performed on the substrate whose horizontal and vertical lengths are each 100 mm.

The process of performing the analysis is as schematically shown in FIG. 20.

As shown in FIG. 20, a circular LED light source (100) and a camera (200) capable of receiving light from the light source were disposed at an interval of about 60 cm. Thereafter, the substrate (10) was disposed between the light source (100) and the camera (200). As shown in FIG. 20, the substrate (10) was disposed to have a distance of 30 cm from each of the light source (100) and the camera (200).

The light source (100) was disposed to radiate light to the center (mass center) of the substrate (10), and the camera (200) was disposed at a position where the light emitted from the light source (100) could be directly incident when the substrate (10) was not present. In addition, the substrate (10) was disposed so that the surface on which the spacers were formed faced the direction of the light source (100).

The light source (100) was an LED (Light Emitting Diode) light source (100) radiating light with a wavelength of about 550 nm, which had a circular shape with a diameter of about 3 mm or so. As the camera (200), Nikon's product (product name: COOLPIX S8200) was used.

In this state, light was irradiated from the light source (100) toward the substrate (10), and an image of the light transmitted through the substrate (10) was recorded in the camera (200). At this time, the shooting mode of the camera (200) was set to a scenery mode.

The recorded image (analysis target image) was changed to a black-and-white image using the Image J program (ImageJ bundled with 64-bit Java 1.8.0_172).

To analyze the received light, the Threshold function of the Image J program was used. In the absence of the substrate, light was irradiated with the LED light source (100) of FIG. 20 and the image received by the camera (200) was changed to a black-and-white image, where the white image was used as a reference image. When the reference image was changed, the automatically designated threshold value through the Threshold function of the Image J program was also input in the same way when analyzing other images.

As shown in FIG. 21, for the obtained image (image in which the analysis target image was changed to the black-and-white image), a horizontal line (L1) and a vertical line (L2), and two diagonal lines (L3 and L4) in the direction that the angle (90 degrees) formed by the horizontal line (L1) and the vertical line (L2) was bisected were designated, and the lengths of the pixels of the white image were obtained along each line, and the area of the white image was also obtained.

FIG. 21 schematically shows the black-and-white image, and in FIG. 21, a portion indicated by B is a black region of the black-and-white image, and a portion indicated by W is a white region (white image).

The pixel length of the white image is the number of pixels in the portion where the white image exists, which is dimensionless. That is, here, the pixel lengths of the horizontal line (L1), the vertical line (L2), and the diagonal lines (L3, L4) are the numbers of pixels of the regions occupied by the horizontal line (L1), the vertical line (L2), and the diagonal lines (L3, L4), respectively.

The length of the horizontal line (L1) is the length of the line passing through the center of the white image in the vertical direction of the black-and-white image, and the length of the vertical line (L2) is the length of the line passing through the center of the white image in the horizontal direction of the black-and-white image. The point (center point) where the horizontal line (L1) and the vertical line (L2) intersect has been set to a position where the four regions of the white image divided by the horizontal line (L1) and the vertical line (L2) can have substantially the same area as each other. In addition, the left and right diagonal lines (L3, L4) have a direction forming 45 degrees with the vertical line (L2) and the horizontal line (L1), respectively, while passing through the center point of the white image. That is, the directions of the horizontal line (L1), the vertical line (L2), and the diagonal lines (L3, L4) each form an angle of 45 degrees to each other.

It means that the smaller the deviation between the area of the white image in the black-and-white image of the analysis target image obtained in the above manner and the area of the white image of the reference image, the smaller the diffraction phenomenon.

As described above, the reference image is a white image obtained by irradiating light with the LED light source (100) in the absence of the substrate (10) and changing the image received by the camera (200) into a black-and-white image, so that the area of the image is the area (A2) of the white image in the black-and-white image of the LED light in this specification.

In the following table, the areas (A1) (area ratios relative to the light source area (unit: %) of the analysis target images when the area (A2) of the white image as the reference image was viewed as 100%, that is, the white images in the black-and-white images obtained by transmitting LED light through the substrates were described, and their ratios (A1/A2) were also described.

When the standard deviation of the lengths of the four lines (L1 to L4) obtained for the white image in the black-and-white image of the analysis target image obtained in the above manner is 50 or less, it can be evaluated that the diffraction phenomenon is small.

2. Evaluation of Optical Density

The optical density is a result of measurement in the following manner. In a laminate in which a transparent layer (ITO (indium tin oxide) layer) is formed on a transparent PET (poly(ethylene terephthalate)) base film, a curable composition for spacer pattern production is applied on the transparent layer, and irradiated with ultraviolet rays (wavelength: about 365 nm, ultraviolet irradiance level: 2,200 mJ/cm$^2$ to 4,400 mJ/cm$^2$) to be cured, thereby forming a layer having a thickness of 6 μm or so. In this specification, the thickness is a value measured using Optical Profiler measuring equipment (manufacturer: Nano System, trade name: Nano View-E1000). Subsequently, the transmittance and optical density of the formed layer are measured using a measuring device (manufacturer: x-rite, trade name: 341C). The measuring device is a device that measures the transmittance (unit: %) (T) for light within the visible light wavelength range (400 to 700 nm) and obtains the optical density (D) through the same, and the optical density for the relevant thickness (6 μm) is obtained by assigning the measured transmittance (T) to an equation (optical density (OD)=−log 10 (T), T is the transmittance).

3. Measurement of Partition Wall Height and Line Width

Hereinafter, the height of the spacer as described was confirmed using a measuring device (Optical Profiler, Nano System Co., Nano View-E1000). The line width of the spacer was confirmed using an optical microscope (Olympus BX 51).

Example 1

Design of Spacer Pattern

The line spacer pattern as shown in FIG. 17 was designed in the following manner. FIG. 17 is a photograph of the spacer pattern photographed with an optical microscope (magnification: ×10). For the design of the spacer pattern, as shown in FIG. 3(a), a so-called honeycomb shape in which regular hexagons were regularly arranged was designed. At this time, the length of one side of the regular hexagon was set to about 350 μm or so. Subsequently, as shown in FIG. 3(b), the line spacer pattern was formed by removing sides from the regular hexagons.

Thereafter, the respective points of the formed line spacer (movement illustrated by the dotted line arrows in FIG. 3(c), the same application to other spacers) were moved with an irregularity degree of 90%, and the curvature was also given to the lines connecting adjacent points among the points with an irregularity degree of about 80% to change them into curved lines (curved line formation exemplified by solid arrows in FIG. 3(c)). Here, the matter that the points are moved with an irregularity degree of 90% means that when the length of the straight line connecting adjacent points in one line spacer is P, each of the two points forming the straight line length P is the center of the circle, a circular region having a radius of 90% (0.45P) relative to 0.5P, which is 0.5 times the length P, is set, and then the point is moved to an arbitrary point in the region within the set circle.

Here, the matter that the curvature has been given with an irregularity degree of 80% means that the lower limit of the curvature is 0R and the upper limit of the curvature is 100R, and then the straight line has been formed to the curved line to have the curvature of any value within the range of 0R to 80R.

The design of the spacer was performed using Minitab as a random number coordinate program, and the same program was used in all examples below.

As a result of the design, the length ($L_1$) (corresponding to $L_1$ of FIG. 1) of the straight line connecting both ends of the non-linear line spacer of FIG. 17 was in the range of approximately 18 to 22 mm or so, and the average was in a level of about 20 mm.

Also, as two straight lines parallel to the straight line connecting both ends of each non-linear line spacer, two straight lines contacting the most protruding portions in the left and right directions of the spacer had an interval (interval corresponding to X in FIG. 1) therebetween in a level of about 58 μm to 65 μm, where the average was about 61 μm, and the standard deviation was about 2 or so.

In addition, the pitch (corresponding to P in FIG. 2) between straight lines connecting both ends of each of the plurality of non-linear line spacers was in a level of about 350 μm.

Manufacture of Substrate, and the Like

A curable composition for producing a spacer pattern was prepared in the following manner. The composition was prepared by mixing ball spacers with a binder containing an ultraviolet curable acrylate compound, a polymerization initiator, and a dispersant as a binder commonly used in the manufacture of column spacers. At this time, as the ball spacers, black ball spacers having an average particle diameter of 6 μm or so were used. The ball spacers were formulated in an amount of about 2.5 parts by weight relative to 100 parts by weight of the binder weight (the total weight of the acrylate compound, initiator, dispersant, etc.). The ball spacer was the black ball spacer, and carbon black, as a darkening material, was formulated in the curable composition in a ratio of approximately 3.5 wt %. As a result of confirming the optical density (OD) of the prepared composition in the above-described manner, it was about 0.9 or so based on the thickness of approximately 6 μm. In a uniaxially stretched PET (poly(ethylene terephthalate)) film in which an amorphous ITO (indium tin oxide) film was formed on the surface, the composition was dropped in an amount of about 2 mL to 3 mL or so on the electrode layer, and irradiated with ultraviolet rays via a mask to cure the curable composition layer (ultraviolet irradiance level: 14,400 mJ/cm$^2$). As the mask, the conventional photomask, wherein openings having the same shape as the designed spacer pattern were formed thereon, was used.

After ultraviolet irradiation, the uncured curable composition was removed (developed) to form the spacer pattern as shown in FIG. 17. The formed spacer pattern had the same shape as designed, where the line width was about 15 μm or so, and the height was about 6 μm or so. Also, the aperture ratio (percentage of the area occupied by the spacer pattern relative to the total area of the substrate) was about 8% or so. An optical device was manufactured in a known manner using the manufactured substrate. Specifically, the optical device was manufactured by introducing a liquid crystal material into the spacer patterns of the substrate, and attaching a second substrate to the spacer patterns of the substrate so as to face the substrate. In such an optical device, the gap between the two substrates was stably maintained, and appearance defects due to non-uniformity of the substrate gap, and the like were not observed.

Comparative Example 1

A substrate was manufactured in the same manner as in Example 1, except that the spacer pattern in a shape in which linear line spacers were regularly arranged at intervals of about 350 μm or so as in FIG. 22 was formed. The line width, height, and aperture ratio of the line spacers were the same as in Example 1. An optical device was manufactured in the same manner as in Example 1 using the substrate of Comparative Example 1. In the manufactured optical device, the gap between the two substrates was stably maintained, and appearance defects due to non-uniformity of the substrate gap, and the like were not observed.

Example 2

Design of Spacer Pattern

The line spacer pattern as shown in FIG. 5 was designed in the following manner. First, a spacer pattern including non-linear line spacers was designed in the same manner as in Example 1. Subsequently, among the plurality of the formed non-linear line spacers, adjacent spacers were connected by bridges. At this time, one bridge was arbitrarily formed for each region with a length of 4 mm based on the length (designed average value of about 20 mm) of the straight line connecting both ends of each line spacer. At this time, the curvature was given to the bridge with an irregularity degree of 80% or so (that is, after setting the lower limit of the curvature to 0R and the upper limit thereof to 100R, curved line formation of the straight line to have optionally a curvature of any value within the range of 0R to 80R).

As a result, about 5 bridges were formed on average within the interval of adjacent non-linear line spacers. In addition, the gap between adjacent bridges within the interval of the adjacent non-linear line spacers was within a range of greater than about 0 mm to 7 mm. Also, about 55 bridges were formed per 30 line spacers.

Manufacture of Substrate, and the Like

A spacer pattern was formed in the same manner as in Example 1, except that a mask in which apertures having the same shape as the designed spacer pattern were formed was used as the photomask. The formed spacer pattern had the same shape as designed, where the line width was about 15

μm or so and the height was about 6 μm or so. In addition, the aperture ratio (percentage of the area occupied by the spacer pattern relative to the total area of the substrate) was about 8% or so. An optical device was manufactured in the same manner as in Example 1 using the manufactured substrate. In the manufactured optical device, the gap between the two substrates was stably maintained, and appearance defects due to non-uniformity of the substrate gap, and the like were not observed.

Example 3

Design of Spacer Pattern

The line spacer pattern shown in FIG. 6 was designed in the following manner. First, a spacer pattern including non-linear line spacers was designed in the same manner as in Example 1. Subsequently, the designed patterns including non-linear line spacers were crossed at an angle of about 90 degrees to form a pattern in a shape as shown in FIG. 7. Subsequently, among the non-linear line spacers formed in the vertical direction in the pattern of FIG. 7, spacer lines existing at intervals of adjacent non-linear line spacers were removed to form a desired pattern.

The removal was performed so that 1 to 4 bridges remained for each region with a length of 1 mm based on the length of the straight line (designed average value of about 20 mm) connecting both ends of each line spacer formed in the vertical direction.

As a result, bridges were formed within the interval of adjacent non-linear line spacers. In addition, the gap between adjacent bridges within the interval of the adjacent non-linear line spacers was in the range of about 250 μm to 1000 μm, and approximately 140 bridges were formed per 20 line spacers.

Manufacture of Substrate, and the Like

A spacer pattern was formed in the same manner as in Example 1, except that a mask in which apertures having the same shape as the designed spacer pattern were formed was used as the photomask. The formed spacer pattern had the same shape as designed, where the line width was about 15 μm or so and the height was about 6 μm or so. In addition, the aperture ratio (percentage of the area occupied by the spacer pattern relative to the total area of the substrate) was about 10% or so. An optical device was manufactured in the same manner as in Example 1 using the manufactured substrate. In the manufactured optical device, the gap between the two substrates was stably maintained, and appearance defects due to non-uniformity of the substrate gap, and the like were not observed.

Example 4

Design of Spacer Pattern

A spacer pattern including non-linear line spacers was designed in the same manner as in Example 1, and the designed patterns including non-linear line spacers were crossed at an angle of about 90 degrees to form a pattern in a net shape as shown in FIG. 7. The number of closed figures existing in the net shape when formed in this way was about 10,000, and when 100 closed figures were selected among them and the area was calculated, the average value of the area was about 0.195 mm$^2$ or so, and the standard deviation was about 0.031 or so. Here, 100 closed figures were selected to have a quadrangular shape with 10 closed figures horizontally and 10 closed figures vertically (see FIG. 14).

In addition, the formed closed figures were numbered in the same manner as in FIG. 14, and as a result of selecting all 9 closed figures by a method of selecting closed figures of 1, 2, 3, 11, 12, 13, 21, 22 and 23, closed figures of 4, 5, 6, 14, 15, 16, 25, 26 and 27, or closed figures of 8, 9, 10, 18, 19, 20, 28, 29 and 30 to confirm the area, the average value was about 0.191 mm$^2$ or so, and the standard deviation was about 0.040 or so.

Manufacture of Substrate, and the Like

A spacer pattern was formed in the same manner as in Example 1, except that a mask in which apertures having the same shape as the designed spacer pattern were formed was used as the photomask. The formed spacer pattern had the same shape as designed, where the line width was about 15 μm or so and the height was about 6 μm or so. In addition, the aperture ratio (percentage of the area occupied by the spacer pattern relative to the total area of the substrate) was about 8% or so. An optical device was manufactured in the same manner as in Example 1 using the manufactured substrate. In the manufactured optical device, the gap between the two substrates was stably maintained, and appearance defects due to non-uniformity of the substrate gap, and the like were not observed.

Comparative Example 2

A substrate was manufactured in the same manner as in Example 2, except that the spacer pattern in a shape in which linear line spacers were regularly arranged at intervals of about 350 μm or so as in FIG. 23 and straight bridges connected the interval of adjacent line spacers was formed. The line width, height, and aperture ratio of the line spacers were the same as in Example 2. In the pattern of FIG. 23, there were about 140 bridges per 20 line spacers, and the intervals between the bridges were about 700 μm or so, which were the same. An optical device was manufactured in the same manner as in Example 1 using the manufactured substrate. In the manufactured optical device, the gap between the two substrates was stably maintained, and appearance defects due to non-uniformity of the substrate gap, and the like were not observed.

Comparative Example 3

A substrate was formed in the same manner as in Example 1, except that the net-shaped spacer pattern of FIG. 15 was applied. The shape of the pattern in FIG. 15 is a pattern formed by crossing straight line patterns arranged at regular intervals, which is a square pattern in which a quadrangle as each single closed figure has a side length of about 350 μm. An optical device was manufactured in the same manner as in Example 1 using the manufactured substrate. In the manufactured optical device, the gap between the two substrates was stably maintained, and appearance defects due to non-uniformity of the substrate gap, and the like were not observed.

The analysis results of the diffraction patterns of Examples and Comparative Examples were summarized and described in Table 1 below.

TABLE 1

|  | | Area ratio relative to light source area (%) | Pixel length (=number of pixel) | | | | |
|---|---|---|---|---|---|---|---|
|  | | | Horizontal length | Vertical length | Diagonal line 1 | Diagonal line 2 | Standard deviation |
| Example | 1 | 112(A1/A2 = 1.12) | 310 | 206 | 225 | 222 | 46.9 |
|  | 2 | 116(A1/A2 = 1.16) | 314 | 224 | 221 | 239 | 43.8 |
|  | 3 | 121(A1/A2 = 1.21) | 316 | 258 | 233 | 240 | 37.7 |
|  | 4 | 141(A1/A2 = 1.41) | 324 | 313 | 252 | 251 | 38.9 |
| Comparative Example | 1 | 121(A1/A2 = 1.21) | 516 | 200 | 216 | 216 | 152.8 |
|  | 2 | 115(A1/A2 = 1.15) | 501 | 264 | 218 | 222 | 134.9 |
|  | 3 | 129(A1/A2 = 1.29) | 391 | 384 | 217 | 224 | 96.5 |

FIGS. 24 to 27 are images of Examples 1 to 4, respectively, and FIGS. 28 to 30 are images of Comparative Examples 1 to 3, respectively. In each figure, the image on the left side is an image before black-and-white conversion, and the image on the right side is an image after black-and-white conversion.

The invention claimed is:

1. A substrate comprising:
a base layer; and
a spacer pattern formed on the base layer,
wherein the spacer pattern comprises non-linear line spacers, and
wherein each non-linear line spacer satisfies Equation 1 below:

$$250 \leq L_1/X \leq 1000 \quad \text{[Equation 1]}$$

wherein $L_1$ is a length of a straight line connecting opposite ends of the non-linear line spacer, and X is an interval between two straight lines that are parallel to the straight line of the length $L_1$ and that contact farthest protruding portions in the respective left and right directions of the non-linear line spacer.

2. The substrate according to claim 1, wherein the spacer pattern is configured such that when LED light with a wavelength of 550 nm is passed through the substrate, a standard deviation of lengths of horizontal, vertical, and left and right diagonal lines of a white image in a black-and-white image generated from the LED light is 80 or less.

3. The substrate according to claim 1, wherein for each non-linear line spacer, an average value of intervals between two straight lines that are parallel to a straight line connecting opposite ends of each non-linear line spacer and that contact farthest protruding portions in the respective left and right directions of the non-linear line spacer is in a range of 10 μm to 200 μm, and a standard deviation of the intervals is 5 or less.

4. The substrate according to claim 1, wherein the non-linear line spacer comprises curved portions having a curvature in a range of 20R to 90R.

5. The substrate according to claim 1, wherein straight lines connecting opposite ends of each of the non-linear line spacers have a pitch in a range of 100 μm to 600 μm between adjacent ones of the non-linear line spacers.

6. The substrate according to claim 1, wherein the non-linear line spacers cross each other to form closed figures.

7. The substrate according to claim 6, wherein a total number of intersections forming each closed figure is in a range of 3 to 10.

8. The substrate according to claim 6, wherein an average of internal areas of the closed figures is in a range of 0.01 mm² to 2 mm², and a standard deviation of the internal areas of the closed figures is 50 or less.

9. The substrate according to claim 8, wherein a ratio of the average of the internal areas of the closed figures to an average of internal areas of 9 of the closed figures that are any one of the closed figures and 8 of the closed figures directly surrounding the any one of the closed figures is in a range of 0.5 to 1.5.

10. The substrate according to claim 9, wherein a standard deviation of the internal areas of the any one of the closed figures and the 8 of the closed figures directly surrounding the any one of the closed figures is 10 or less.

11. The substrate according to claim 1, further comprising an electrode layer disposed between the base layer and the spacer pattern, the spacer pattern being in contact with the electrode layer.

12. An optical device comprising the substrate of claim 1 and a second substrate disposed opposite to the substrate, a gap between the substrate and the second substrate being maintained by the spacer pattern of the substrate.

13. The optical device according to claim 12, further comprising a liquid crystal material disposed in the gap between the substrate and the second substrate.

14. A substrate comprising:
a base layer;
a spacer pattern formed on the base layer and comprising non-linear line spacers; and
bridge portions connecting adjacent ones of the non-linear line spacers,
wherein the substrate satisfies at least one of Equation 2, Equation 3, Equation 4, or Equation 5 below:

$$0 \text{ mm} < G_1 \leq 0.4 \times L_1 \quad \text{[Equation 2]}$$

wherein $G_1$ is a gap between adjacent ones of the bridge portions, and $L_1$ is a length of a straight line connecting opposite ends of each non-linear line spacer;

$$L_2 \times (m-1) = a \times n \quad \text{[Equation 3]}$$

wherein $L_2$ is an average value of lengths of straight lines connecting opposite ends of each of the non-linear line spacers, m is a total number of the non-linear line spacers in the spacer pattern, n is a total number of the bridge portions, and a is a number in a range of 2 to 20;

$$0 \text{ mm} < G_1 \leq b \times L_1 \quad \text{[Equation 4]}$$

wherein b is a number in a range of 0.001 to 0.5;

$$L_2 \times (m-1) = f \times n \quad \text{[Equation 5]}$$

wherein f is a number in a range of 0.01 to 10.

15. The substrate according to claim 14, wherein each bridge comprises curved portions having a curvature in a range of 20R to 90R.

* * * * *